(12) United States Patent
Onishi et al.

(10) Patent No.: US 10,229,475 B2
(45) Date of Patent: Mar. 12, 2019

(54) APPARATUS, SYSTEM, AND SIGNAL PROCESSING METHOD FOR IMAGE PICKUP USING RESOLUTION DATA AND COLOR DATA

(71) Applicant: CANON KABUSHIKI KAISHA, Tokyo (JP)

(72) Inventors: Tomoya Onishi, Ayase (JP); Noriyuki Kaifu, Atsugi (JP); Fujio Kawano, Kawasaki (JP); Hisashi Takado, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/094,685

(22) Filed: Apr. 8, 2016

(65) Prior Publication Data

US 2016/0309130 A1    Oct. 20, 2016

(30) Foreign Application Priority Data

Apr. 15, 2015    (JP) .................. 2015-083609

(51) Int. Cl.
  *G06T 3/40* (2006.01)
  *H04N 9/04* (2006.01)
(52) U.S. Cl.
  CPC ........... *G06T 3/4015* (2013.01); *H04N 9/045* (2013.01)

(58) Field of Classification Search
  CPC ...... H04N 5/217; H04N 9/735; G06T 3/4015; G06T 3/4038
  See application file for complete search history.

(56) References Cited

U.S. PATENT DOCUMENTS

2007/0024934 A1\* 2/2007 Andams, Jr. .......... G06T 3/4015
                                                  358/525
2014/0240567 A1\* 8/2014 Saito ..................... G06T 3/4015
                                                  348/302

FOREIGN PATENT DOCUMENTS

| CN | 101233763 A | 7/2008 |
|---|---|---|
| CN | 103039066 A | 4/2013 |
| JP | 9-238358 A | 9/1997 |
| JP | 2012/188608 A | 10/2012 |
| WO | 10/004726 A1 | 1/2010 |
| WO | 13/108656 A1 | 5/2015 |

\* cited by examiner

*Primary Examiner* — Nelson D. Hernández Hernández
(74) *Attorney, Agent, or Firm* — Canon USA, Inc. IP Division

(57) ABSTRACT

Resolution data is generated by using signals output by a first pixel group. Color data is generated by using signals output by a second pixel group. The resolution data is combined with the color data to generate first data. Up-conversion processing is performed on the first data to generate second data, and mosaic processing is performed on the second data to generate data of a predetermined array.

23 Claims, 17 Drawing Sheets

FIG. 3A

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

FIG. 3B

| R | W | G | W | R | W | G | W |
|---|---|---|---|---|---|---|---|
| W | W | W | W | W | W | W | W |
| G | W | B | W | G | W | B | W |
| W | W | W | W | W | W | W | W |
| R | W | G | W | R | W | G | W |
| W | W | W | W | W | W | W | W |
| G | W | B | W | G | W | B | W |
| W | W | W | W | W | W | W | W |

FIG. 3C

| W | R | W | G | W | R | W | G |
|---|---|---|---|---|---|---|---|
| B | W | G | W | B | W | G | W |
| W | G | W | R | W | G | W | R |
| G | W | B | W | G | W | B | W |
| W | R | W | G | W | R | W | G |
| B | W | G | W | B | W | G | W |
| W | G | W | R | W | G | W | R |
| G | W | B | W | G | W | B | W |

FIG. 3D

| R | G | B | G | R | G | B | G |
|---|---|---|---|---|---|---|---|
| G | G | G | G | G | G | G | G |
| B | G | R | G | B | G | R | G |
| G | G | G | G | G | G | G | G |
| R | G | B | G | R | G | B | G |
| G | G | G | G | G | G | G | G |
| B | G | R | G | B | G | R | G |
| G | G | G | G | G | G | G | G |

FIG. 4A

| M | Y | M | Y | M | Y | M | Y |
|---|---|---|---|---|---|---|---|
| Y | C | Y | C | Y | C | Y | C |
| M | Y | M | Y | M | Y | M | Y |
| Y | C | Y | C | Y | C | Y | C |
| M | Y | M | Y | M | Y | M | Y |
| Y | C | Y | C | Y | C | Y | C |
| M | Y | M | Y | M | Y | M | Y |
| Y | C | Y | C | Y | C | Y | C |

FIG. 4B

| M | W | Y | W | M | W | Y | W |
|---|---|---|---|---|---|---|---|
| W | W | W | W | W | W | W | W |
| Y | W | C | W | Y | W | C | W |
| W | W | W | W | W | W | W | W |
| M | W | Y | W | M | W | Y | W |
| W | W | W | W | W | W | W | W |
| Y | W | C | W | Y | W | C | W |
| W | W | W | W | W | W | W | W |

FIG. 4C

| W | M | W | Y | W | M | W | Y |
|---|---|---|---|---|---|---|---|
| C | W | Y | W | C | W | Y | W |
| W | Y | W | M | W | Y | W | M |
| Y | W | C | W | Y | W | C | W |
| W | M | W | Y | W | M | W | Y |
| C | W | Y | W | C | W | Y | W |
| W | Y | W | M | W | Y | W | M |
| Y | W | C | W | Y | W | C | W |

FIG. 4D

| M | Y | C | Y | M | Y | C | Y |
|---|---|---|---|---|---|---|---|
| Y | Y | Y | Y | Y | Y | Y | Y |
| C | Y | M | Y | C | Y | M | Y |
| Y | Y | Y | Y | Y | Y | Y | Y |
| M | Y | C | Y | M | Y | C | Y |
| Y | Y | Y | Y | Y | Y | Y | Y |
| C | Y | M | Y | C | Y | M | Y |
| Y | Y | Y | Y | Y | Y | Y | Y |

FIG. 12

| CONDITION | LUMINANCE (lux) | COLOR DATA AVERAGE PROCESSING FRAME NUMBER (n) | NOISE DEGRADATION DEGREE | IMAGE LAG DEGREE |
|---|---|---|---|---|
| No. 1 | 10 | 1 | ○ | ○ |
| No. 2 | 10 | 4 | ○ | △ |
| No. 3 | 1 | 1 | △ | ○ |
| No. 4 | 1 | 4 | ○ | △ |
| No. 5 | 0.1 | 1 | × | ○ |
| No. 6 | 0.1 | 4 | △ | △ |

FIG. 14

| CONDITION | LUMINANCE (lux) | RESOLUTION DATA AVERAGE PROCESSING FRAME NUMBER (m) | COLOR DATA AVERAGE PROCESSING FRAME NUMBER (n) | NOISE DEGRADATION DEGREE | IMAGE LAG DEGREE |
|---|---|---|---|---|---|
| No. 1 | 10 | 1 | 1 | ○ | ○ |
| No. 2 | 1 | 1 | 4 | ○ | △ |
| No. 3 | 1 | 2 | 4 | ○ | ▲ |
| No. 4 | 0.1 | 1 | 1 | × | ○ |
| No. 5 | 0.1 | 1 | 4 | ▲ | △ |
| No. 6 | 0.1 | 2 | 4 | △ | ▲ |
| No. 7 | 0.01 | 1 | 4 | × | △ |
| No. 8 | 0.01 | 2 | 4 | ▲ | ▲ |
| No. 9 | 0.01 | 4 | 4 | △ | × |

APPARATUS, SYSTEM, AND SIGNAL PROCESSING METHOD FOR IMAGE PICKUP USING RESOLUTION DATA AND COLOR DATA

BACKGROUND OF THE INVENTION

Field of the Invention

One disclosed aspect of the embodiments relates to an image pickup apparatus, an image pickup system, a signal processing method for the image pickup apparatus, and a signal processing method.

Description of the Related Art

Color filters (hereinafter, will be referred to as CFs) through which specific wavelength components such as, for example, lights having respective colors of red, green, and blue transmit are provided on an element surface for each pixel unit in an image pickup element to obtain a color image. Hereinafter, red, green, and blue will be referred to as R, G, and B. A pixel on which the CF of R is arranged will be referred to as an R pixel. A pixel on which the CF of G is arranged will be referred to as a G pixel. A pixel on which the CF of B is arranged will be referred to as a B pixel. In a case where the R pixel, the G pixel, and the B pixel are collectively mentioned, those pixels will be referred to as RGB pixels.

A configuration is proposed in which a proportion of pixels which are facilitated to obtain luminance information is increased to improve a sensitivity of the image pickup element. The sensitivity is improved by using a white pixel (hereinafter, will be referred to as a W pixel) through which light in a visible light range widely transmit among those pixels, and it is possible to obtain an image having a high signal-to-noise (S/N) ratio.

Japanese Patent Laid-Open No. 2011-55038 discloses an image pickup element in which the RGB pixels and the W pixels are arranged. Hereinafter, the RGB pixels and the W pixels are collectively mentioned, those pixels will be referred to as RGBW pixels. Japanese Patent Laid-Open No. 2011-55038 discloses a configuration in which an image processing unit performs blur correction processing on an output signal of the image pickup element including the RGBW pixels.

SUMMARY OF THE INVENTION

One disclosed aspect of the embodiments has been made in view of the above-described issues, and there is provided an image pickup apparatus including: a first pixel group including a plurality of pixels each including a photoelectric conversion unit; a second pixel group including a plurality of pixels each including a photoelectric conversion unit; and a signal processing unit, the image pickup apparatus outputting data to an image processing unit configured to generate an image from data of a predetermined array, in which each of the photoelectric conversion units included in the first pixel group and each of the photoelectric conversion units included in the second pixel group have mutually different wavelength bands of lights to be photoelectrically converted, the signal processing unit generates resolution data by using signals output by the pixels included in the first pixel group, generates color data by using signals output by the pixels included in the second pixel group, and generates first data by combining the resolution data with the color data, generates second data by performing up-conversion processing on the first data, and performs processing of setting the second data as the data of the predetermined array.

Further features of the disclosure will become apparent from the following description of exemplary embodiments with reference to the attached drawings.

BRIEF DESCRIPTION OF THE DRAWINGS

FIGS. 3A to 3D illustrate a CF array of the image pickup element.

FIGS. 4A to 4D illustrate a CF array of the image pickup element.

FIG. 12 illustrates evaluation results of a picked-up image.

FIG. 14 illustrates the evaluation results of the picked-up image.

DESCRIPTION OF THE EMBODIMENTS

According to a technology described in Japanese Patent Laid-Open No. 2011-55038, discussion in terms of reduction in color noise caused in an image generated by using the signal output by the image pickup element including the RGBW pixels has been insufficient.

The following examples relate to a technology for reducing the color noise.

Hereinafter, an exemplary embodiment will be described with reference to the drawings.

Figure 1:
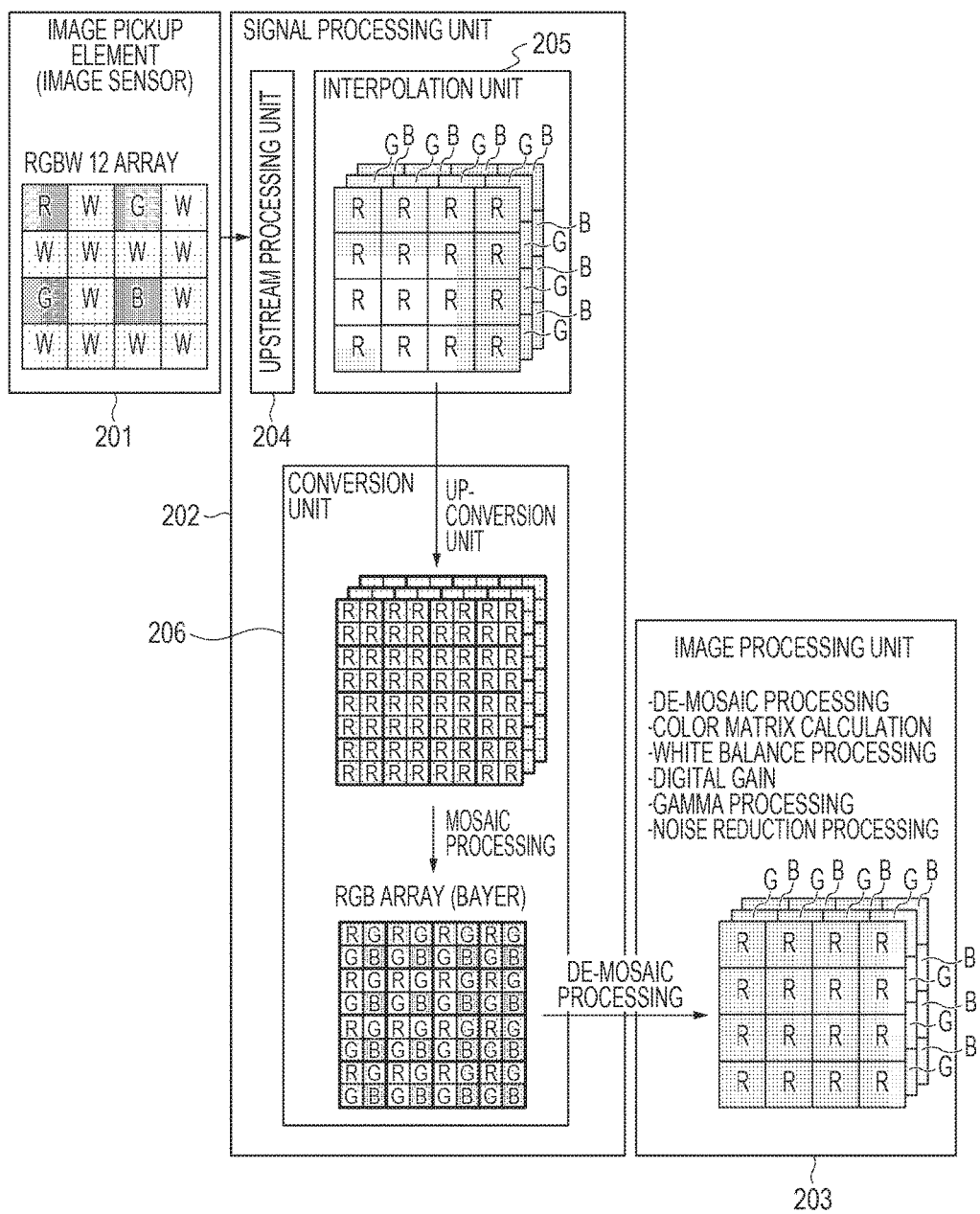
FIG. 1 illustrates signal processing of an image pickup apparatus.

FIG. 1 illustrates a configuration of an image pickup apparatus in addition to an image processing unit 203 provided to an outside of the image pickup apparatus and signal processing performed by the image pickup apparatus. The image pickup apparatus includes an image pickup element 201 and a signal processing unit 202. The signal processing unit 202 includes an upstream processing unit 204, an interpolation unit 205, and a conversion unit 206. The signal processing unit 202 generates data obtained by performing interpolation processing and up-conversion processing on an output signal output by the image pickup element 201. The signal processing unit 202 further performs mosaic processing on the generated data to generate a mosaic image and outputs data to the image processing unit 203. Predetermined data input to the image processing unit 203 has a Bayer array according to the present exemplary embodiment. FIG. 1 also illustrates data generated by each of the interpolation unit 205, the conversion unit 206, and the image processing unit 203. The data illustrated in FIG. 1 is data generated as a result of processing performed by each of the units. For example, the data illustrated in the image processing unit 203 is data generated when the image processing unit 203 performs de-mosaic processing on the data output by the conversion unit 206.

A Complementary Metal Oxide Semiconductor (CMOS) image sensor or a Charge Coupled Device (CCD) image sensor can be used as the image pickup element 201. According to the present exemplary embodiment, the CMOS image sensor is used among those.

The image pickup element 201 according to the present exemplary embodiment includes a plurality of pixels. Each of the plurality of pixels includes a light transmission part. Part of pixels among the plurality of pixels includes a color filter (CF) through which light having a wavelength corresponding to one of colors including red (R), green (G), and blue (B) transmits. Each of the plurality of pixels includes a photoelectric conversion unit configured to generate charges based on incident light. In the photoelectric conversion unit, a spectral characteristic varies for each of the plurality of pixels since the wavelength of the light that transmits through the CF varies for each pixel. It should be noted that the pixel provided so as to generate the charges based on the incident light will be referred to as an effective pixel. According to the present exemplary embodiment, with regards to the number of the effective pixels provided to the image pickup element 201, 1920 pixels are arranged in a horizontal direction and 1080 pixels are arranged in a vertical direction.

In the image pickup element 201 of FIG. 1, the respective pixels are illustrated while being denoted by R, G, B, and W. This indicates the color corresponding to the wavelength of the light that transmits through the light transmission part of each of the pixels. R denotes red, G denotes green, B denotes blue, and W denotes white. It should be noted that the light transmission part of the W pixel can be made of resin alone.

The image pickup element 201 according to the present exemplary embodiment has a CF array called RGBW 12 array. It should be noted that no CF is arranged in the W pixel, but when an array pattern of the light transmission parts of the plurality of pixels is mentioned, this is mentioned as a CF array. In the RGBW 12 array, the respective pixels are arranged at a quantity ratio represented by a ratio of R:G:B:W=1:2:1:12 among 4×4=16 pixels. According to the RGBW 12 array, any of pixels including the R pixel, the G pixel, and the B pixel corresponding to the color pixels is arranged so as to be adjacent to the W pixel in any of a vertical direction, a horizontal direction, and a diagonal direction in a plan view. That is, the color pixel is surrounded by the W pixels in the vertical direction, the horizontal direction, and the diagonal direction in the plan view. In addition, according to the RGBW 12 array, the proportion of the W pixels is ¾ of the total number of pixels. That is, the W pixels are provided as first pixels, and color pixels (RGB pixels) are provided as second pixels. The number of pixels in a first pixel group is three times (more than twice) as much as the number of pixels in a second pixel group. It should be noted that the image pickup element 201 may include pixels other than the effective pixels in some cases, such as an optical black pixel and a dummy pixel, which are not directly output to the image, but these pixels are not included in any of the first pixel group and the second pixel group described above. It should be noted that the W pixel is constituted as a pixel including no CF. According to this configuration, a wavelength band having a sensitivity in the W pixel includes all of wavelength bands having a sensitivity in each of the R pixel, the G pixel, and the B pixel. Thus, since the W pixel has a wider spectral sensitive characteristic than that of the RGB pixels, the W pixel has a higher sensitivity than that of the RGB pixels.

In a case where the above-described RGBW 12 array is used, since the color pixel is surrounded by the W pixels, an accuracy at a time of interpolating a value of W at a position of the color pixel is improved.

The signal processing unit 202 performs signal processing on the output signal output by the image pickup element 201. The signal processing unit 202 includes the upstream processing unit 204, the interpolation unit 205, and the conversion unit 206.

An output signal from the image pickup element 201 is input to the upstream processing unit 204 of the signal processing unit 202. The upstream processing unit 204 performs corrections such as offset correction and gain correction on the respective signals.

The interpolation unit 205 performs the interpolation processing on the data output by the upstream processing unit 204. The interpolation unit 205 also performs the de-mosaic processing. The de-mosaic processing according to the present exemplary embodiment is processing of obtaining R data, G data, and B data from signals of the R, G, and B pixels through a bilinear method. In the de-mosaic processing according to the present exemplary embodiment, an R component corresponding to a value estimated to be obtained in a case where the R pixel is supposed to be located at the position of the W pixel is interpolated with regard to the R data. Similarly, in the de-mosaic processing according to the present exemplary embodiment, interpolations are also performed to respectively generate the B data and the G data with regard to each of a B component and a G component similarly as in the R component.

The number of pixels per unit area of the W pixels where resolution information can be obtained in the RGBW 12 array is more than that in a case where the W pixels are arranged in a checkered pattern. According to this configuration, the resolution information having a higher spatial frequency (that is, a finer pitch) can be obtained as compared with a case where the W pixels are arranged in the checkered pattern. That is, the signal processing unit 202 can generate the data having a higher sense of resolution by using the output signal output by the image pickup element 201 in the RGBW 12 array as compared with the output signal output by the image pickup element where the W pixel pixels are arranged in the checkered pattern.

The conversion unit 206 performs the up-conversion processing and the mosaic processing by using the data output by the interpolation unit 205. The up-conversion processing refers to processing of increasing the resolution by generating, from data having a first resolution before the processing, data having a second resolution higher than the first resolution. According to the present exemplary embodiment, the output signal output from the image pickup element 201 has a resolution of 1920×1080 that is so-called 2K1K resolution. In contrast to this 2K1K input data, the data output by the signal processing unit 202 has an up-converted resolution of 3840×2160 that is so-called 4K2K resolution. That is, the conversion unit 206 according to the present exemplary embodiment performs the processing of generating the four pixel signals by using the one pixel signal output by the interpolation unit 205.

A nearest neighbor method, the bilinear method, a bicubic method, and the like can be employed as a method for the up-conversion processing. It should be noted that the conversion unit 206 according to the present exemplary embodiment performs the mosaic processing, which will be described below, after the up-conversion processing is performed. In this case, accumulation of data processing errors can be avoided by employing the nearest neighbor method.

The conversion unit 206 according to the present exemplary embodiment performs the mosaic processing. The mosaic processing performed by the conversion unit 206 according to the present exemplary embodiment is processing of generating Bayer data by using the respective color data of the R data, the G data, and the B data. This Bayer data is data obtained in a case where the RGB pixels are arranged in the Bayer array in a single image sensor.

The image processing unit 203 generates a picked-up image by using the predetermined array data output by the signal processing unit 202. The image processing unit 203 appropriately executes the de-mosaic processing, color matrix calculation, white balance processing, digital gain, gamma processing, noise reduction processing, and the like. Among these processings, the de-mosaic processing is more significantly involved than the other processings with respect to the resolution information of the picked-up image. According to the present exemplary embodiment, the conversion unit 206 performs the up-conversion processing and thereafter performs the mosaic processing. For this reason, among 2×2 data (one R signal, two G signals, and one B signal) output by the conversion unit 206, by using the one R signal, the image processing unit 203 can generate the one R signal of the R data. The G data and the B data corresponding to the other colors of the image processing unit 203 can also be generated by the same processing as the generation of the R data.

A case where the conversion unit 206 performs the mosaic processing without performing the up-conversion processing by way of experiment will be described with reference to FIG. 8.

Figure 8:
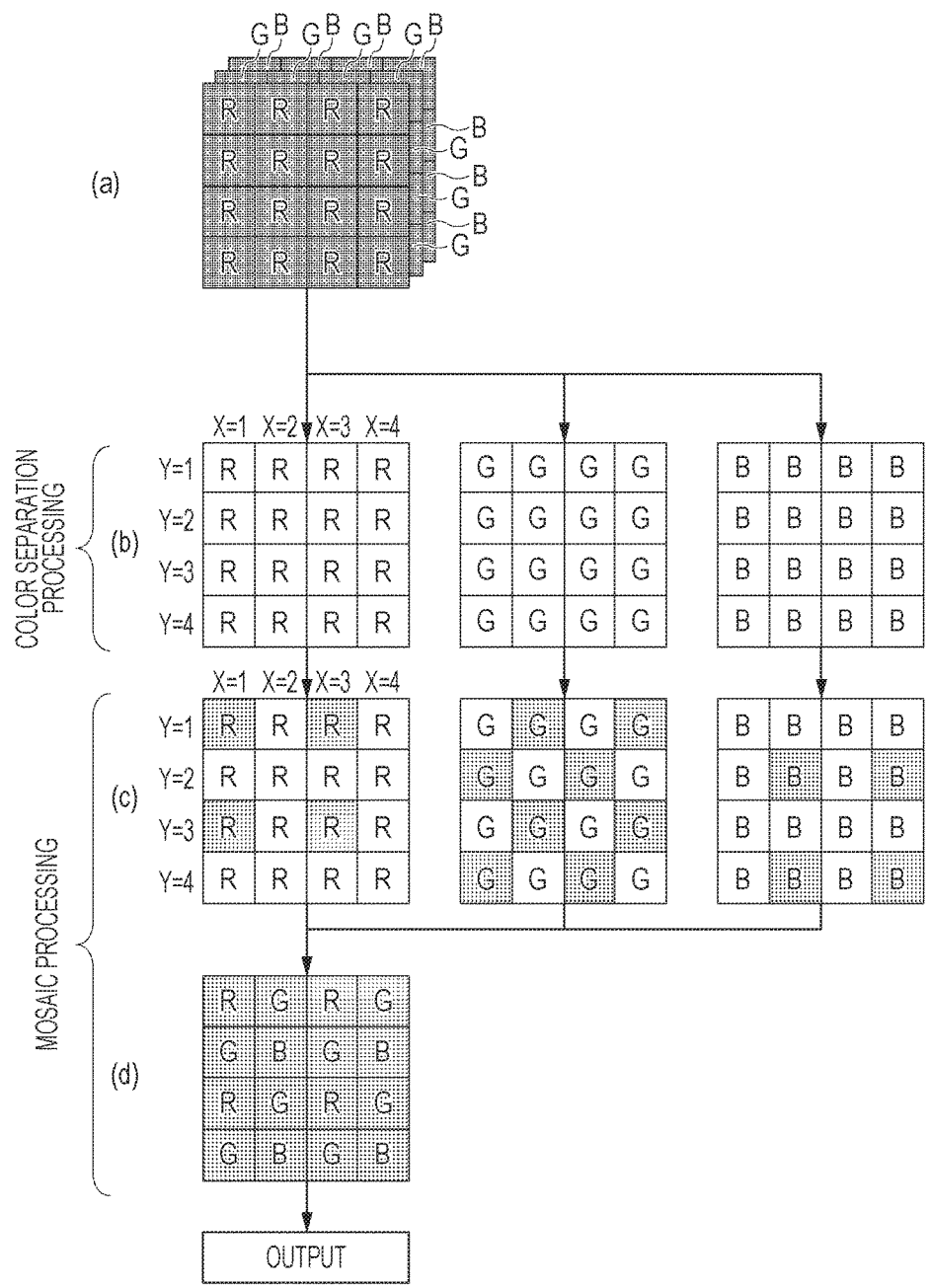
FIG. 8 illustrates the signal processing of the image pickup apparatus.

As illustrated in FIG. 8, the conversion unit 206 outputs data obtained by performing the mosaic processing on the data output by the interpolation unit 205 to the image processing unit 203. The image processing unit 203 performs the interpolation processing on the parts corresponding to the G signal and the B signal in the generation of the R data by using the values of the surrounding R signals. Since this interpolation processing is performed, a decrease in the resolution occurs in the output data in the processing illustrated in FIG. 8. With regard to the other colors of the G data and the B data too, decrease in the resolution occurs similarly as in the R data. Thus, the decrease in the resolution occurs with respect to the data output by the image pickup element 201 in the picked-up image generated by the image processing unit 203 by using the data output by the conversion unit 206 through the processing of FIG. 8. In addition, since the image processing unit 203 performs the interpolation processing, a false color is generated in the picked-up image in which a color different from the original color of a subject is generated.

On the other hand, in the processing according to the present exemplary embodiment, the image processing unit 203 can generate each of the R data, the G data, and the B data without performing the interpolation processing on the data output by the conversion unit 206. According to this configuration, the decrease in the resolution and the generation of the false color due to the de-mosaic processing performed for the generation of the picked-up image by the image processing unit 203 hardly occur.

In addition, a design of the image processing unit 203 in the signal processing according to the present exemplary embodiment can be the same as a design in which the output signal output by the image pickup element 201 in the Bayer array of the RGB pixels is processed instead of the image pickup element 201 including the W pixel as in the present exemplary embodiment. Thus, the signal processing according to the present exemplary embodiment can reduce costs of separately designing the image processing unit 203 for the image pickup element 201 including the W pixel. That is, the signal processing according to the present exemplary embodiment suppresses a decrease in compatibility between the image pickup apparatus and the image processing unit 203. Thus, it is possible to generate the picked-up image in which the color noise is reduced while the decrease in the compatibility between the image pickup apparatus and the image processing unit 203 is suppressed in the signal processing according to the present exemplary embodiment.

The signal processing unit 202 and the image processing unit 203 described according to the present exemplary embodiment may be hardware such as a computer that executes software where the signal processing method is programmed. The signal processing according to performed by the signal processing unit 202 and the image processing unit 203 according to the present exemplary embodiment may be programmed in a program distributed by way of a recording medium such as a CD-ROM or a DVD-ROM or a communication.

Example 1

Hereinafter, the image pickup apparatus according to the present example will be described with reference to the drawings. It should be noted that descriptions will be appropriately given with reference to the image pickup apparatus of FIG. 1.

Figure 2:
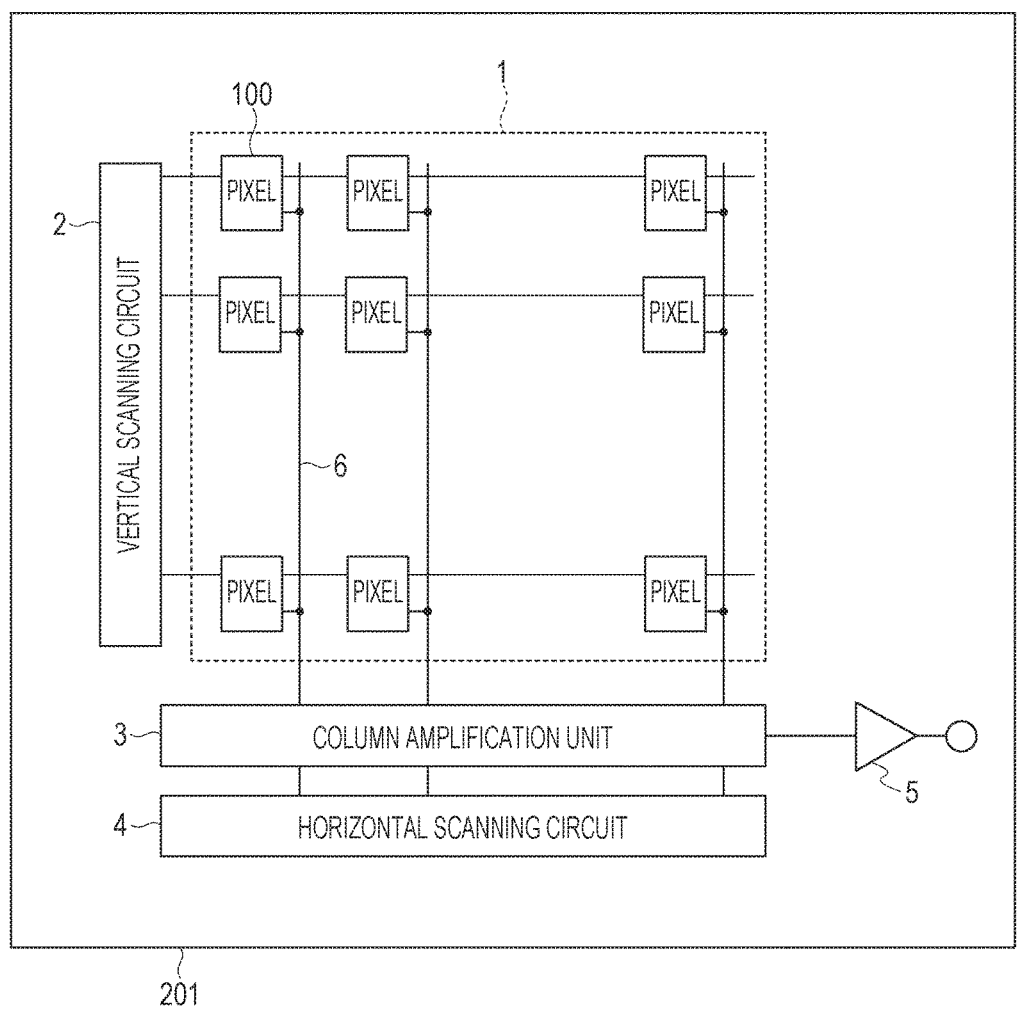
FIG. 2 illustrates a configuration of an image pickup element.

FIG. 2 illustrates an example of the image pickup element 201 according to the present example. The image pickup element 201 according to the present example includes an image pickup area 1 having a pixel array in which pixels 100 are arranged in rows and columns, a vertical scanning circuit 2, a column amplification unit 3, a horizontal scanning circuit 4, and an output unit 5. The vertical scanning circuit 2 supplies a control signal for turning a transistor of the pixel 100 on (conductive state) or off (non-conductive state) to the transistor of the pixel 100. Vertical signal lines 6 for reading out signals from the pixels 100 for each column are arranged in the image pickup area 1. The horizontal scanning circuit 4 includes a switch of the column amplification unit 3 in each column and the horizontal scanning circuit 4 that supplies a control signal for performing a control to turn the switch on or off. Signals are sequentially output from the respective columns of the column amplification unit 3 to the output unit 5 by scanning performed by the horizontal scanning circuit 4. The signal output from the column amplification unit 3 via the output unit 5 is input to the signal processing unit 202 located outside of the image pickup element 201 as described with reference to FIG. 1.

It should be noted that the example has been described in which the output signal output by the image pickup element 201 is an analog signal, but the image pickup element 201 may output a digital signal. In that case, analog-to-digital conversion performed by the signal processing unit 202 may be omitted.

Figure 5:
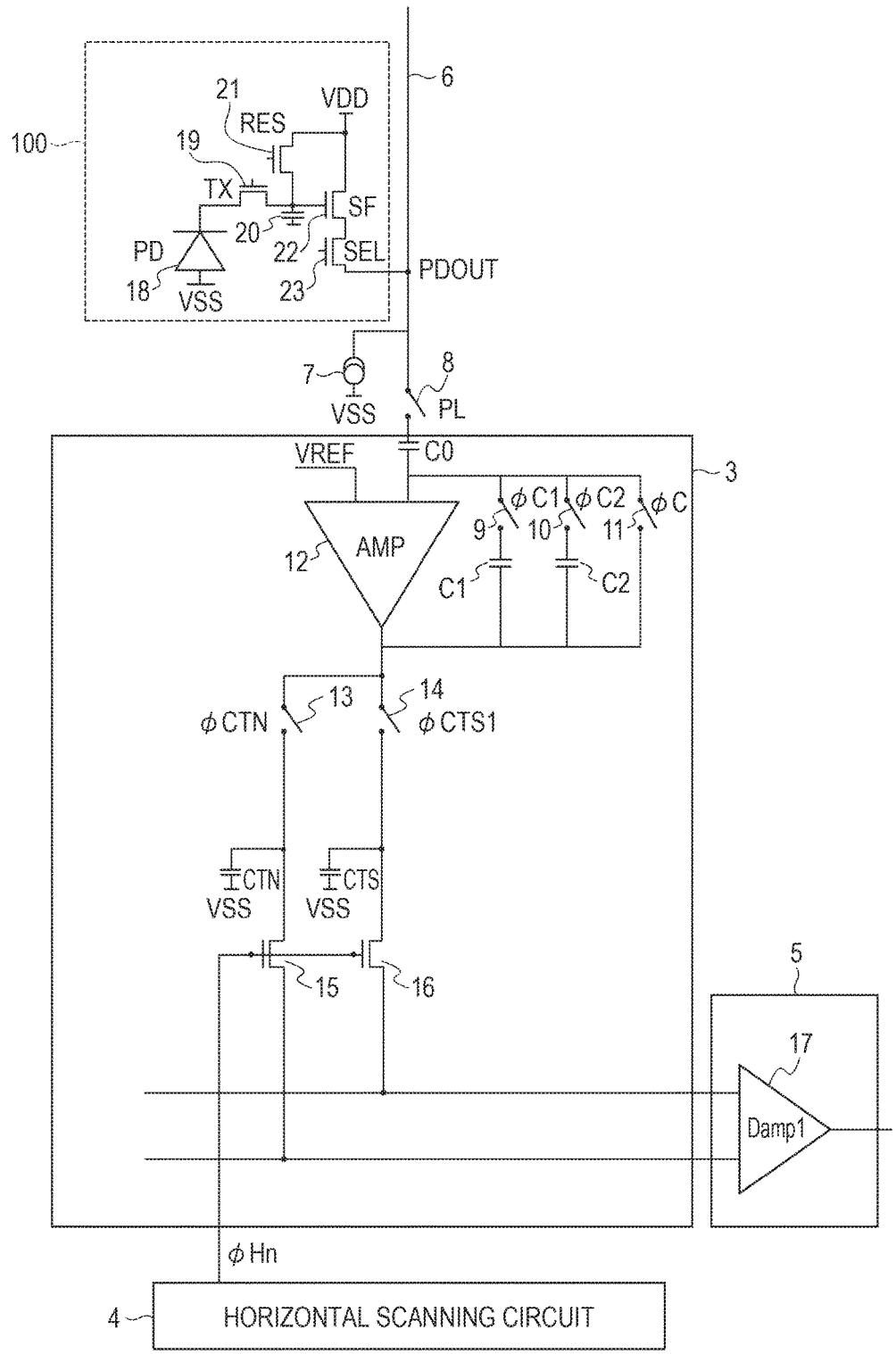
FIG. 5 illustrates a configuration of the image pickup element.

Hereinafter, the image pickup apparatus of FIG. 2 will be described with reference to FIG. 5. The vertical scanning circuit 2 controls signal levels of a signal PTX, a signal PRES, and a signal PSEL supplied to the pixel 100 to perform vertical scanning corresponding to scanning in units of row on the pixels 100 in the image pickup area 1. Each of the pixels 100 outputs a photoelectric conversion signal from a PDOUT terminal to the vertical signal line 6 by the vertical scanning performed by the vertical scanning circuit 2. A current source 7 supplies a current to the pixel 100 via the vertical signal line 6. A switch 8 controls an input to the column amplification unit 3.

The column amplification unit 3 includes a capacitance C0, a capacitance C1, a capacitance C2, a switch 9, a switch 10, a switch 11, and an amplification circuit 12 to determine an amplification factor of the column amplification unit 3. The column amplification unit 3 also includes a switch 13, a switch 14, a holding capacitance CTN, and a holding capacitance CTS to perform sampling and holding and a switch 15 and a switch 16 to establish a connection to a horizontal transfer line.

The horizontal scanning circuit 4 sequentially controls the conductive state and the non-conductive state of the switch 15 and the switch 16 for each column where the amplification circuit 12 is arranged. According to this configuration, the horizontal scanning circuit 4 performs horizontal scanning corresponding to scanning in units of column of the column amplification unit 3.

When the horizontal scanning circuit 4 puts the switch 15 and the switch 16 into the conductive state, the signals held in the holding capacitance CTN and the holding capacitance CTS are input to an output amplifier 17. The output amplifier 17 outputs signals obtained by amplifying the input signals to the outside of the image pickup element.

A detail of the image pickup element 201 will be further described with reference to FIG. 5. The pixel 100 includes a photodiode 18, a transistor 19, a floating diffusion capacitance 20, a transistor 21, a transistor 22, and a transistor 23.

The photodiode (which may also be referred to as FD in some cases) 18 is a photoelectric conversion unit configured to accumulate the charges based on the incident light.

The photodiode 18 is connected to one terminal of the transistor 19, and the floating diffusion capacitance 20 is connected to the other terminal of the transistor 19. The floating diffusion capacitance (which may also be referred to as FD in some cases) 20 has a structure also serving as a drain terminal of the transistor 19 and can hold the charges transferred from the photodiode 18 via the transistor 19 (which may also be referred to as TX in some cases). The charges accumulated in the photodiode 18 are held when the signal PTX input to a gate terminal of the transistor 19 from the vertical scanning circuit 2 turns to a High level (which may also be referred to as H level in some cases).

When the signal PRES input from the vertical scanning circuit 2 turns to the H level, the transistor 21 resets a potential of the floating diffusion capacitance 20 to a potential based on a power supply voltage VDD (which may also be referred to as RES in some cases).

An input node of the transistor 22 is electrically connected to the floating diffusion capacitance 20. A source follower (which may also be referred to as SF in some cases) is constituted in which a bias current is supplied to one main node of the transistor 22 from the current source 7 connected via the vertical signal line 6, and the power supply voltage VDD is supplied to the other main node of the transistor 22.

When the signal PSEL input from the vertical scanning circuit 2 turns to the H level, the transistor 23 outputs the signal output by the transistor 22 to the vertical signal line 6. A node from which the transistor 23 outputs the signal to the vertical signal line 6 is the node PDOUT. The signal output by the transistor 22 is a signal based on the charges held by the floating diffusion capacitance 20.

Next, an operation of the column amplification unit 3 will be described.

The switch 8 performs control to input the signal output by the pixel 100 to the amplification circuit 12.

The capacitance C0, the capacitance C1, and the capacitance C2 are capacitances used to amplify the amplification circuit 12. While the switch 9 and the switch 10 are controlled, the amplification of the input voltage is performed at a capacitance ratio of C0/C1, C0/C2, or C0/(C1+C2).

The switch 11 performs control to reset the capacitance C1 and the capacitance C2.

While the switch 13 and the switch 14 are controlled, the signal output from the amplification circuit 12 is sampled and held in the holding capacitances CTN and CTS. When the switch 13 is turned ON, an output signal (which may also be referred to as an N signal in some cases) when the floating diffusion capacitance 20 is at a reset level among the signals output by the pixels 100 is sampled and held in the holding capacitance CTN. When the switch 14 is turned on ON, among the output signals from the pixels 100, an output signal (which may also be referred to as an S signal in some cases) when the charges are transferred to the floating diffusion capacitance 20 is sampled and held in the holding capacitance CTS.

When a signal (φHn from the horizontal scanning circuit 4 turns to the H level, the switch 15 and the switch 16 sequentially connect the outputs sampled and held in the holding capacitance CTN and the holding capacitance CTS to the output amplifier 17.

By using the above-described image pickup element, it is possible to read out the optical signal input to the image pickup element as an electric signal.

FIGS. 3A to 3D each illustrate a CF array of the pixels 100.

The CF array illustrated in FIG. 3A is a so-called Bayer array in which red (R), green (G), and blue (B) are arranged.

The CF array illustrated in FIG. 3B is the RGBW 12 array. The array of FIG. 3B is the same array as the CF array of the image pickup element 201 illustrated in FIG. 1.

The CF array illustrated in FIG. 3C is an RGBW 8 array. According to this array, the respective CFs in the 4×4 pixel array are arranged at a ratio of R:G:B:W=2:4:2:8. As the feature of the array, the W pixels are arranged in the checkered pattern, and the proportion of the W pixels arranged is ½ of all the pixels. Since the W pixels are arranged in the checkered pattern, a method of interpolating the G signal in the Bayer array into the adjacent R pixel and B pixel can be employed as a method of interpolating the signal of the W pixel into the adjacent B pixel, G pixel, and R pixel.

The CF array illustrated in FIG. 3D is an RGBW 12 array. This array is an array obtained by replacing the W pixel in the RGBW12 array with the G pixel. According to this RGBW 12 array, the respective CFs among the 4×4 pixel array are arranged at a ratio of R:G:B=2:12:2. The proportion of the G pixels is ¾ of all the pixels. In the RGBW 12 array, each of the R pixel and the B pixel is surrounded by the G pixels respectively in each of the vertical direction, the horizontal direction, and the diagonal direction in the plan view. Since each of the R pixel and the B pixel is surrounded by the G pixels, an accuracy at the time of interpolating the G signal into the R pixel and the B pixel is improved. In addition, since the proportion of the G pixel having a relatively high sensitivity as compared with the R and B pixels is high, the sensitivity is increased.

FIGS. 4A to 4D each illustrate a CF array using C (cyan), M (magenta), and Y (yellow) corresponding to complementary colors as the color pixels. FIG. 4A illustrates a Bayer array in the complementary colors, and the ratio of the CFs is C:M:Y=1:1:2. A reason why more Y pixels are arranged herein is that a human visual performance has a higher sensitivity with respect to the wavelength of Y than that of the other C and M similarly as in the wavelength of G and also has a resolution. By using more Y pixels than the C pixels and the M pixels, it is possible to enhance the sense of resolution.

The CF array illustrated in FIG. 4B is a CMYW 12 array. According to this array, the respective CFs in the 4×4 pixel array are arranged at a ratio of C:M:Y:W=1:1:2:12. As the feature of the array, each of the C pixel, the M pixel, and the Y pixel corresponding to the color pixels is surrounded by the W pixels in each of the horizontal direction, the vertical direction, and the diagonal direction. The proportion of the W pixels arranged is ¾ of all the pixels. In addition, since the color pixel is surrounded by the W pixels, an accuracy of interpolating the value of the W pixel into the color pixel is improved as compared with a case where the W pixel is not located in the diagonal direction of the color pixel, for example, as illustrated in FIG. 4C.

The CF array illustrated in FIG. 4C is a CMYW8 array. According to this array, the respective CFs in the 4×4 pixel array are arranged at a ratio of C:M:Y:W=2:2:4:8. As the feature of the array, the W pixels are arranged in the checkered pattern, and the proportion of the W pixels arranged is ½ of all the pixels. Since the W pixels are arranged in the checkered pattern and become similar to the arrangement of G in the Bayer array, the method for the interpolation of G in the Bayer array can be employed as it is. In addition, since the W pixels are arranged, the sensitivity is increased.

The CF array illustrated in FIG. 4d is a CMYY12 array. The W pixel in a CYMW12 array is replaced by the Y pixel in this array. According to this array, the respective CFs in the 4×4 pixel array are arranged at a ratio of C:M:Y=2:2:12. According to the CMYY12 array, the C pixel and the M pixel are surrounded by the Y pixels in each of the vertical direction, the horizontal direction, and the diagonal direction in the plan view. The proportion of the Y pixels is ¾ of all the pixels. Since each of the C pixel and the M pixel is surrounded by the Y pixels, an accuracy of interpolating the Y signal into the C pixel and the M pixel is improved as compared with the Bayer array of the complementary colors illustrated in FIG. 4A.

As described above, the image pickup element 201 may adopt various CF arrays, but to create an image having a still higher resolution by using the single image sensor, more pixels that mainly generate the resolution information are preferably arranged. That is, the array where the color pixel is surrounded by the W pixels as illustrated in FIG. 3B and FIG. 4B and the array where the G pixels or the Y pixels that mainly generate the resolution information are arranged to surround the pixel of the other colors as illustrated in FIG. 3D and FIG. 4D are preferably adopted. Among those, the array illustrated in FIG. 3B and FIG. 4B where the color pixel is surrounded by the W pixels is preferably adopted because the sensitivity is improved by arranging the W pixels as compared with a case where the pixels of the other colors are arranged.

Figure 6:
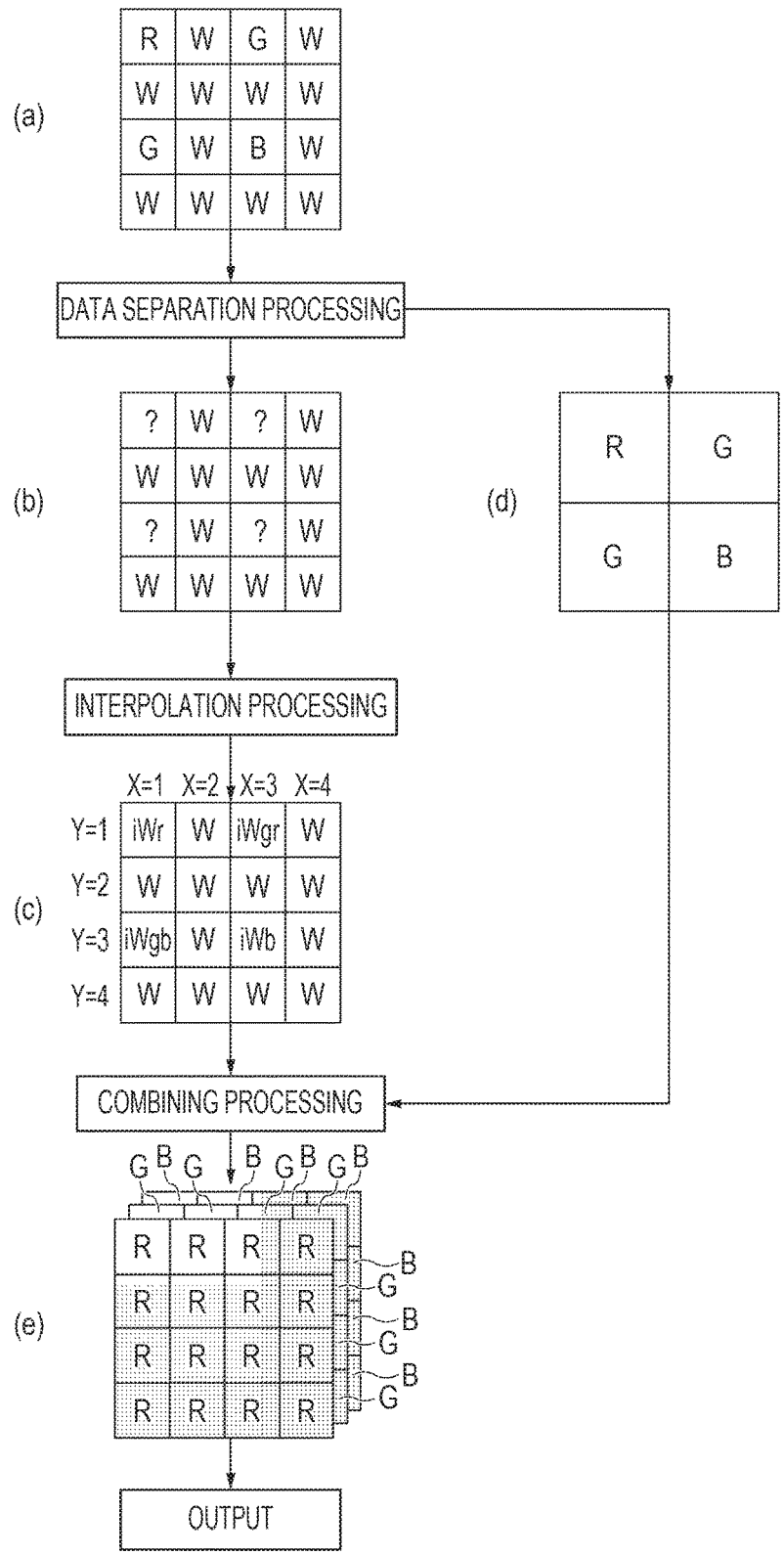
FIG. 6 illustrates the signal processing of the image pickup apparatus.

FIG. 6 illustrates processing performed by the interpolation unit 205 illustrated in FIG. 1. It should be noted that FIG. 6 illustrates a case where the CF array of the image pickup element 201 is the RGBW 12 array.

(a) in FIG. 6 illustrates the data input from the upstream processing unit 204 described above. "Data separation" processing of respectively separating this data into W data and color data (the G signal, the R signal, and the B signal) is performed.

In the W data, signals of pixels where the RGB pixels are arranged among the 4×4 pixels are unclear (represented by the symbol "?" in the drawing) as illustrated in (b) in FIG. 6. The color data corresponds to the 2×2 pixels among the 4×4 pixels and becomes data having a low resolution (spatially course) as illustrated in (d) in FIG. 6.

Next, an interpolation unit performs processing of interpolating the signal represented by "?" by using surrounding signals. Various methods may be adopted as the interpolation processing. As an example, in a case where eight surrounding pixel averaging is performed, a method of performing averaging of four pixels on the left, right, top and bottom (bilinear method), a method of detecting an edge of a surrounding pixel and performing interpolation in a direction perpendicular to an edge direction, a method of detecting a pattern such as a fine line and performing interpolation in its direction, and the like are adopted. Herein, the interpolation processing is performed as in the following manner.

To describe the interpolation method, X and Y coordinates are mentioned in (c) in FIG. 6. For example, a signal denoted by iWb is a signal at coordinates (3, 3) in the W data, which is accordingly denoted by iWb (3, 3). Since iWb is unclear in a state of an input signal, the interpolation needs to be performed. For example, in a case where iWb (3, 3) is interpolated by way of the eight surrounding pixel averaging, iWb (3, 3) is obtained as follows.

$$iWb_{(3,3)} = \frac{W_{(2,2)} + W_{(3,2)} + W_{(4,2)} + W_{(2,3)} + W_{(4,3)} + W_{(2,4)} + W_{(3,4)} + W_{(4,4)}}{8} \quad (1)$$

According to the present example, the processing of interpolating the signal of the pixel where the signal value is unclear from the signal values of the surrounding pixels is performed in this manner. It should be noted that, although the 4×4 pixel group is illustrated, since this pattern is repeated, iWr, iWg, and the like can be interpolated from the information of the surrounding eight pixels.

Next, the interpolation unit 205 generates the color data of the R data, the G data, and the B data by using the interpolated W data and the extracted color data. Various methods may be adopted for the calculation of the colors in the generation of the R data, the G data, and the B data. As an example, a method obtaining a ratio of colors by normalizing the color data. According to this method, the ratio of the colors is calculated by the following expression.

$$\text{RGB\_ratio} = \left[ \frac{R}{R+G+B} \quad \frac{G}{R+G+B} \quad \frac{B}{R+G+B} \right] \quad (2)$$

Where the following expression is set.

$$G = \frac{Gr + Gb}{2} \quad (3)$$

In addition, a method of obtaining a ratio of the color data and the interpolated iWr, iWg, and iWb may be employed. In this case, the ratio of the colors is calculated by the following expression.

$$\text{RGB\_ratio} = \begin{bmatrix} \dfrac{R}{iWr} & \dfrac{Gr+Gb}{iWgr+iWgb} & \dfrac{B}{iWb} \end{bmatrix} \quad (4)$$

According to the present example, a method of obtaining a ratio of the color data and the interpolated iWr, iWgr, iWgb, and iWb is employed.

By using a RGB_ratio corresponding to the thus obtained ratio of the colors and a W signal or signals of the interpolated values iWr, iWgr, iWgb, and iWb, it is possible to obtain the signal values corresponding to the respective colors of R, G, and B in the respective pixels in the following manner.

$$RGB = [R\_\text{ratio} \cdot W \; G\_\text{ratio} \cdot W \; B\_\text{ratio} \cdot W] \quad (5)$$

Where the following expression is set.

$$RGB\_\text{ratio} = [R\_\text{ratio} \; G\_\text{ratio} \; B\_\text{ratio}] \quad (6)$$

The previously obtained color calculation data is used.

The R data, the G data, and the B data each including 4×4=16 pixels are obtained by the processing of the interpolation unit 205. The R data, the G data, and the B data generated by the interpolation unit 205 are first data generated by combining the resolution data with the color data.

Next, processing performed by the conversion unit 206 will be described with reference to FIG. 7.

Figure 7:
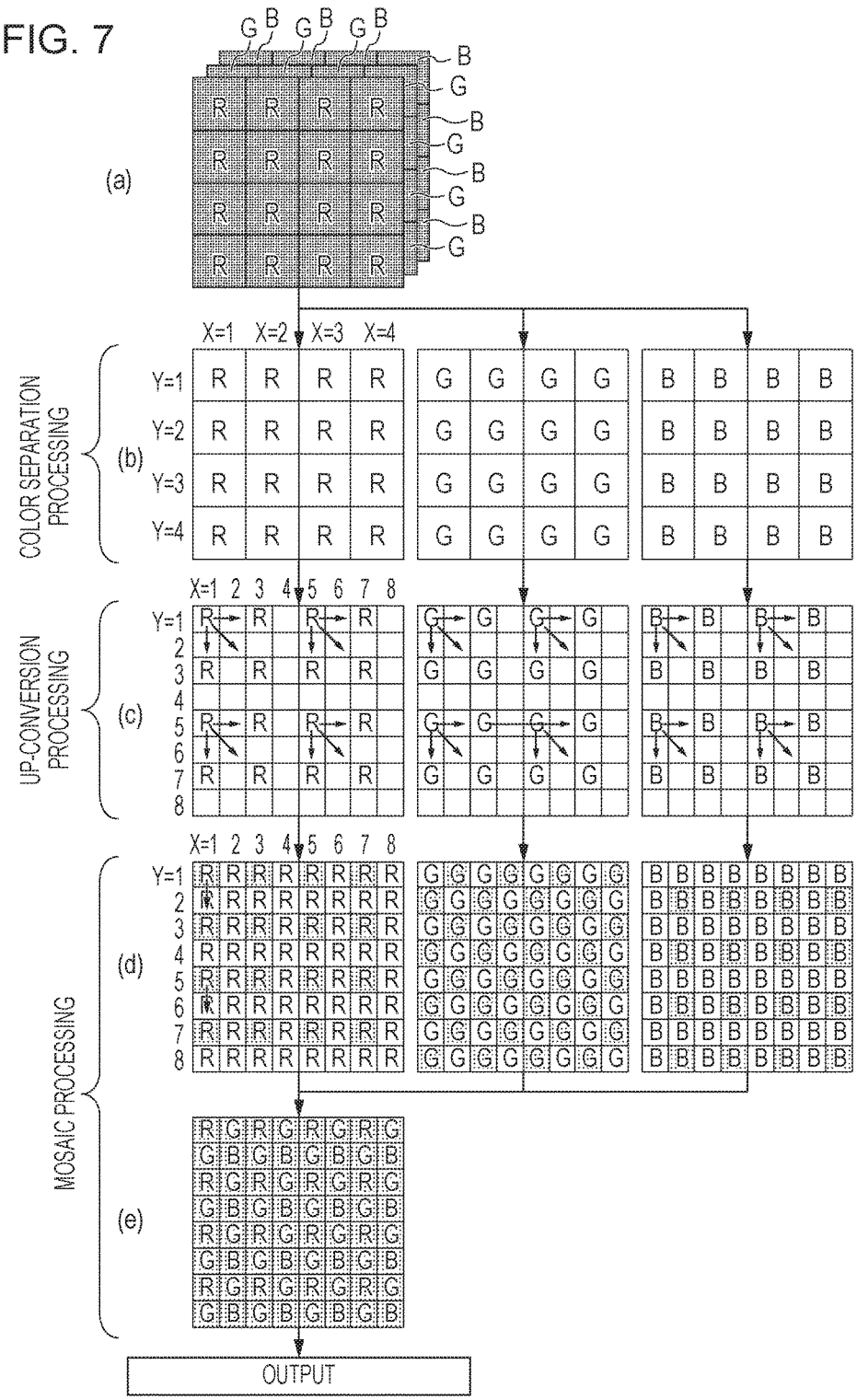
FIG. 7 illustrates the signal processing of the image pickup apparatus.

FIG. 7 illustrates signal processing of performing the up-conversion processing and the mosaic processing on the color data to output the Bayer data.

(a) in FIG. 7 illustrates data input from the interpolation unit 205 described above. First, this data is separated respectively into the R data, the G data, and the B data as illustrated in (b) in FIG. 7.

Each piece of the color data after the color separation is converted to have the twofold resolution in each of the vertical direction and the horizontal direction respectively by the up-conversion processing. To describe the method for the up-conversion, X and Y coordinates are mentioned in (b), (c), and (d) in FIG. 7. For example, since the pixel on the upper left denoted by R is data of R at coordinates of (1, 1), the data is represented as R (1, 1). The pixel R (1, 1) in (b) in FIG. 7 is used as it is for R (1, 1) in (c) in FIG. 7. In (c) in FIG. 7, signal values of the pixels (1, 2), (2, 1), and (2, 2) are all unclear. According to the present example, the nearest neighbor method is employed as the method of interpolating the unclear signal values. Thus, the signals values of (2, 1), (1, 2), and (2, 2) in (c) in FIG. 7 are set to be the same value as R (1, 1).

In this manner, as illustrated in (d) in FIG. 7, each of the R data, the G data, and the B data having the resolution improved to be doubled in each of the vertical direction and the horizontal direction is generated. This data obtained by the up-conversion processing is second data obtained by performing the up-conversion processing on the first data generated by the interpolation unit 205.

Next, to perform the mosaic processing, hatched pixels among the pixels in (d) in FIG. 7 are extracted. In the R data of (d) in FIG. 7, signals having a lowest X coordinate value and a lowest Y coordinate value among the 2×2 signals are used. That is, signals of R (1, 1), R (3, 1), R (5, 1), R (7, 1), R (3, 1) . . . are used. In the G data, similarly as in the Bayer array, data is extracted in the checkered pattern. In the B data, signals having a highest X coordinate value and a highest Y coordinate value among the 2×2 signals are used. That is, signals of R B (2, 2), B (4, 2), B (6, 2), B (8, 1), B (4, 2) . . . are used.

In this manner, the conversion unit 206 obtains the mosaic data illustrated in (e) in FIG. 7. The conversion unit 206 outputs the mosaic data to the image processing unit 203. This mosaic data is data having a predetermined array which is used to create an image by the image processing unit 203. According to the present example, the predetermined array of the data input to the image processing unit 203 is the Bayer array.

The image processing unit 203 performs the operation described with reference to FIG. 1. According to this configuration, the image processing unit 203 generates the picked-up image of the subject.

An evaluation image pickup is performed by the image pickup apparatus that performs the above-described processing. To evaluate the sense of resolution, an evaluation of a TV resolution is performed by using a resolution chart. In addition, as a comparison example, as illustrated in FIG. 8, the conversion unit 206 generates mosaic data without performing the up-conversion processing among the processing operations of FIG. 7. Subsequently, in the comparison example, the image processing unit 203 generates the picked-up image by using this mosaic data.

As a result of the comparison by the above-described method, in the picked-up image obtained by the processing illustrated in FIG. 7 according to the present example, a TV horizontal resolution is more than or equal to 1000. On the other hand, in the picked-up image according to the comparison example, a TV horizontal resolution is 900.

The above-described number of pixel signals may be the number of pixels of the image pickup element in some cases, but the pixel signals by the number that is lower than the number of pixels may be output in some cases by limiting an area where the signal of the image pickup element is output (which may be referred to as partial readout, crop, or the like in some cases) or performing addition inside the image pickup element 201 (which may be referred to as binning in some cases). The processing described according to the present example is realized by performing the up-conversion on the output pixel signals and does not depend on the total number of pixels of the image pickup element 201.

Each of the signal processing unit 202 and the image processing unit 203 according to the present example can be an integrated circuit mounted to a semiconductor substrate.

In addition, the image pickup apparatus according to the present example can be used as a stacked sensor in which the semiconductor substrate on which the signal processing unit 202 is formed is stacked on the semiconductor substrate on which the image pickup element 201 is formed.

It should be noted that the example in which the image processing unit 203 is provided outside of the image pickup apparatus has been described according to the present example. As another example, the image pickup apparatus may include the image processing unit 203.

Example 2

Descriptions will be mainly given of a difference from Example 1 with regard to the image pickup apparatus according to the present example.

According to the present example, processing in a case where the number of signals output from the image pickup element 201 is different from the number of pixels arranged on the image pickup element 201 is performed. Specifically, a case will be described as an example where the image pickup element 201 outputs the signals by the number that is lower than the number of pixels arranged on the image pickup element 201 by reading out the pixel signals only from part of the pixels of the image pickup element 201.

A time used to read out the pixel signals from the pixels 100 of the image pickup element 201 lengthens as the number of the pixels 100 from which the pixel signals are read out is increased. Thus, as the number of the pixels 100 from which the pixel signals are read out is increased, a frame rate is decreased in the case of video, and the number of continuous shooting per second is decreased in the case of still images. Thus, to deal with the increase in the frame rate of the video and the increase in the number of continuous shooting of the still images, the number of signals output by the image pickup element 201 may be set to be lower than the number of pixels arranged on the image pickup element 201 in some cases.

In addition, in a case where focusing is realized by using the pixel signals as in an image plane phase difference AF and a contrast AF, partial image pickup may be performed, and also the frame rate is increased to increase the speed of a focus operation in some cases.

The image pickup element 201 according to the present example includes the number of the pixels 100 corresponding to 1920×1080 in the horizontal direction and the vertical direction, respectively. In the image pickup apparatus according to the present example, the image pickup element 201 is included in an area located at a center area among the pixels 100 arranged in the image pickup element 201, and the pixel signals are read out from the number of the pixels 100 corresponding to 480×270 in the horizontal direction and the vertical direction, respectively.

The processing according to the present example can be set as the same as the processing according to Example 1. The evaluation is performed by using the picked-up image of the resolution chart obtained by this processing. In the picked-up image according to the present example, the TV horizontal resolution is more than or equal to 250. On the other hand, in the output data according to the comparison example, the TV horizontal resolution is 200. Therefore, the image pickup apparatus according to the present example can also attain the same effect as that of Example 1.

Example 3

Descriptions will be mainly given of a difference from Example 1 with regard to the image pickup apparatus according to the present example.

According to the present example, the image pickup apparatus including the image pickup element 201 of the RGBW 12 array can generate the picked-up image having the further reduced color noise as compared with that of Example 1. In the RGBW 12 array, since the R pixel and the B pixel correspond to one pixel each among the 4×4 pixels and the G pixels correspond to two pixels, the number of the color pixels is ¼ of those in the case of the Bayer array. Thus, in the RGBW 12 array, as compared with the Bayer array, the color noise tends to be conspicuous at the time of the image pickup under a condition of a low luminance. This color noise is a collective term of random shot noise and photo shot noise. This color noise can be reduced by performing at least one of spatial average processing and temporal average processing to generate average data. In particular, since the sensitivity of the human visual characteristic with regard to the color information is spatially and also temporally low as compared with the resolution information (luminance information), even when the spatial average processing or the temporal average processing is performed, the decrease in the image quality is hardly recognized by human eyes.

Figure 9:
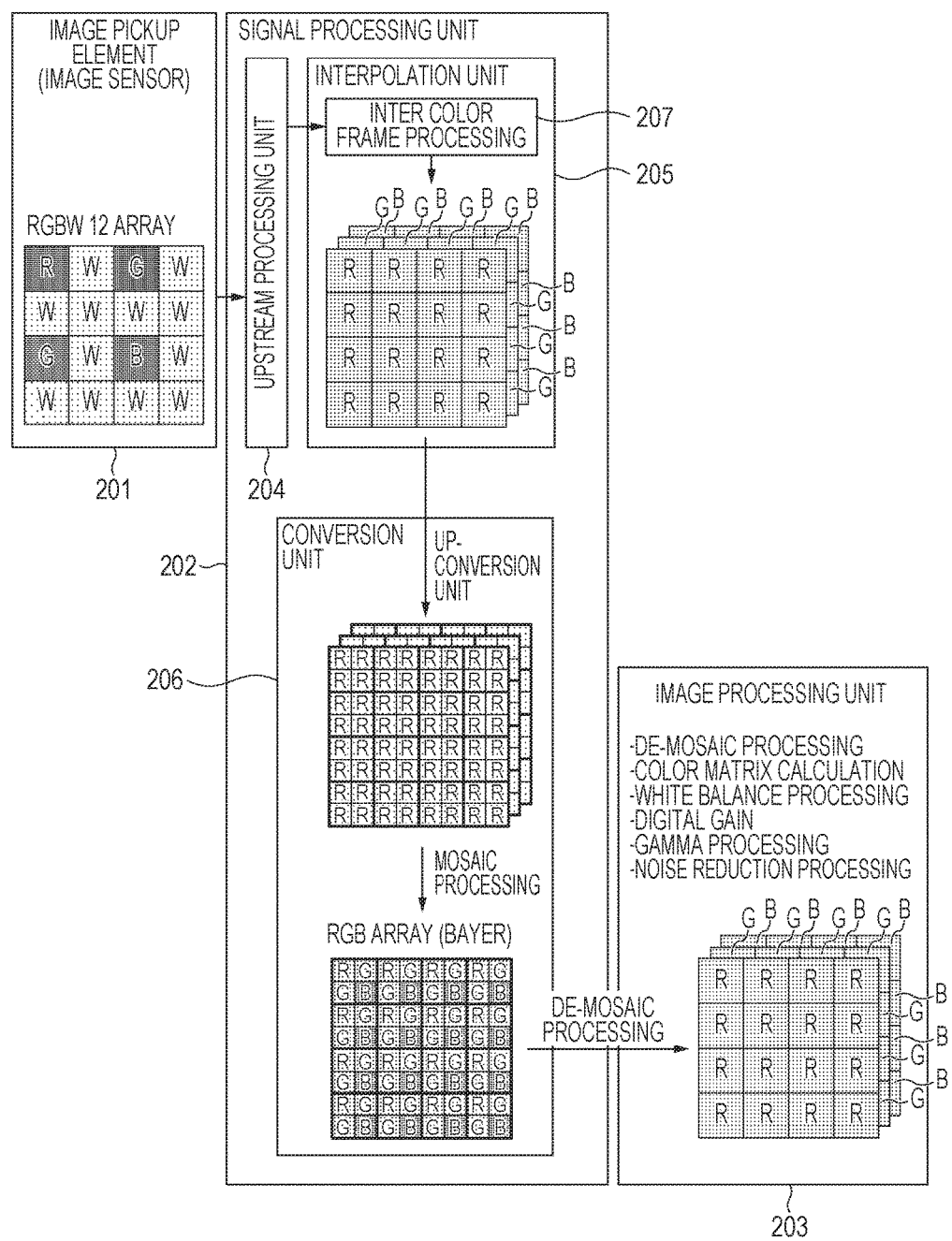
FIG. 9 illustrates the signal processing of the image pickup apparatus.

FIG. 9 illustrates the signal processing performed by the image pickup apparatus according to the present example. A difference from Example 1 resides in that the interpolation unit 205 performs inter color frame processing. The interpolation unit 205 is further provided with a frame memory.

Figure 10:
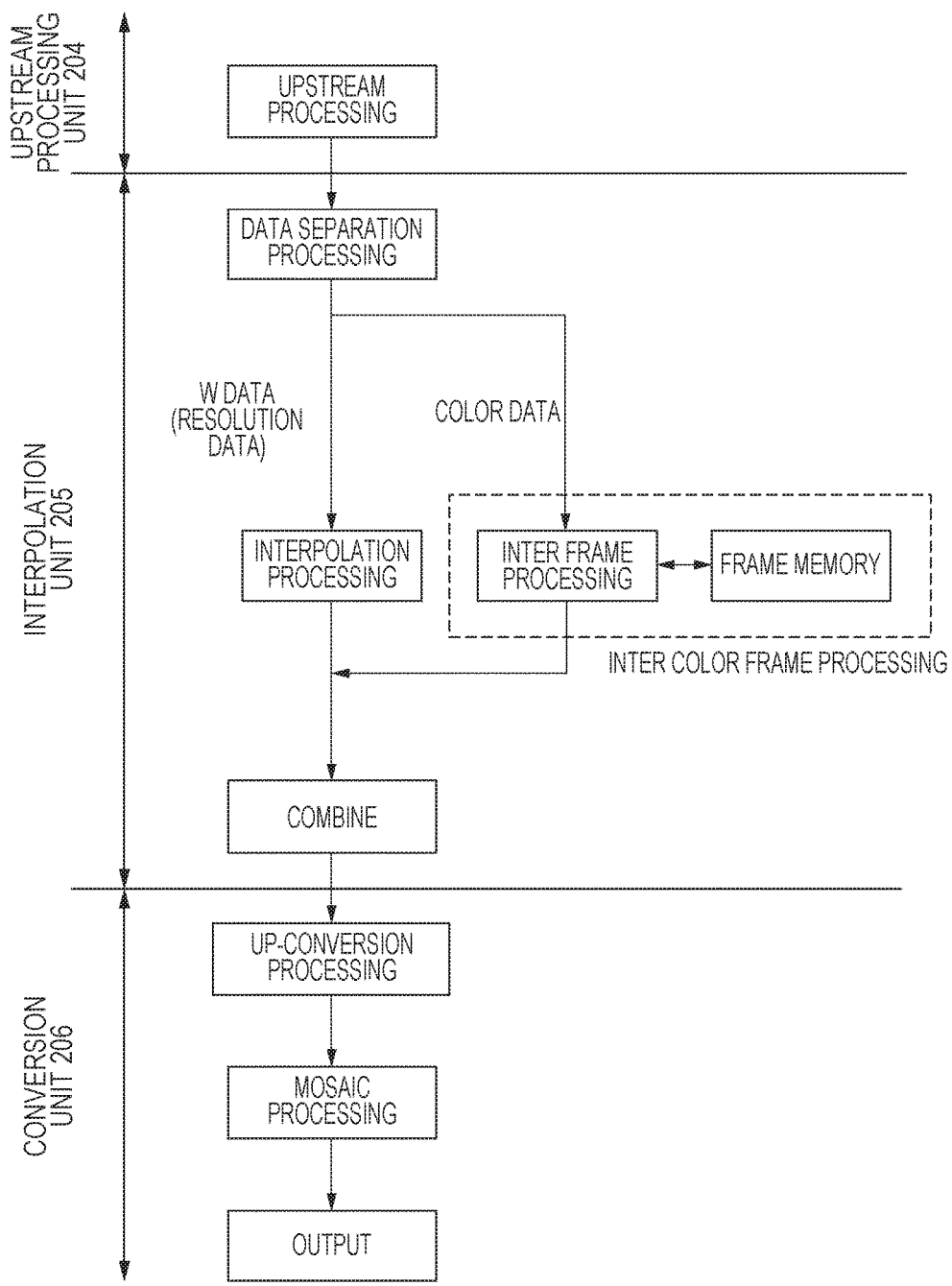
FIG. 10 illustrates the signal processing of the image pickup apparatus.

FIG. 10 illustrates details of the processings by the interpolation unit 205 and the conversion unit 206 among the signal processings illustrated in FIG. 9.

The frame memory of the interpolation unit 205 holds the color data based on the output signal output by the image pickup element 201 in one frame. It should be noted that the signal of the one frame output by the image pickup element 201 refers to a signal output by the image pickup element 201 when the vertical scanning circuit 2 performs vertical scanning of the pixels 100 in a pixel array 1 once. When the vertical scanning circuit 2 performs the vertical scanning plural times, the image pickup element 201 outputs the signals of a plurality of frames. In a case where focus is on the single pixel 100, respective frame periods of the plurality of frames refer to periods where charge accumulation period for accumulating the charges based on the incident light are different from one another. The interpolation unit 205 performs inter frame processing using the color data based on the output signal output by the image pickup element 201 in a different frame and the color data held by the frame memory. This inter frame processing is processing of obtaining average data by performing at least one of the spatial average processing and the temporal average processing using the color data of the plurality of frames.

In the inter frame processing, moving average processing, sequential cyclical processing (infinite impulse response: IIR), or non-sequential cyclical processing (finite impulse response: FIR) can be appropriately used. According to this configuration, the interpolation unit 205 realizes a low-pass filter with respect to the color data and reduces the color noise that fluctuates for each frame. In this manner, the image pickup apparatus according to the present example can obtain the color data having the reduced color noise.

Thereafter, the W data corresponding to the resolution data is combined with the color data. At this time, the processing is performed while it is assumed that the color ratio is maintained to be substantially constant or a strong color correlation exists in a local area. That is, since the color ratio of the interpolated resolution data in the part of the color pixels is close to that of the surrounding colors, the color data is created by multiplying the resolution data by the color ratio.

Figure 11:
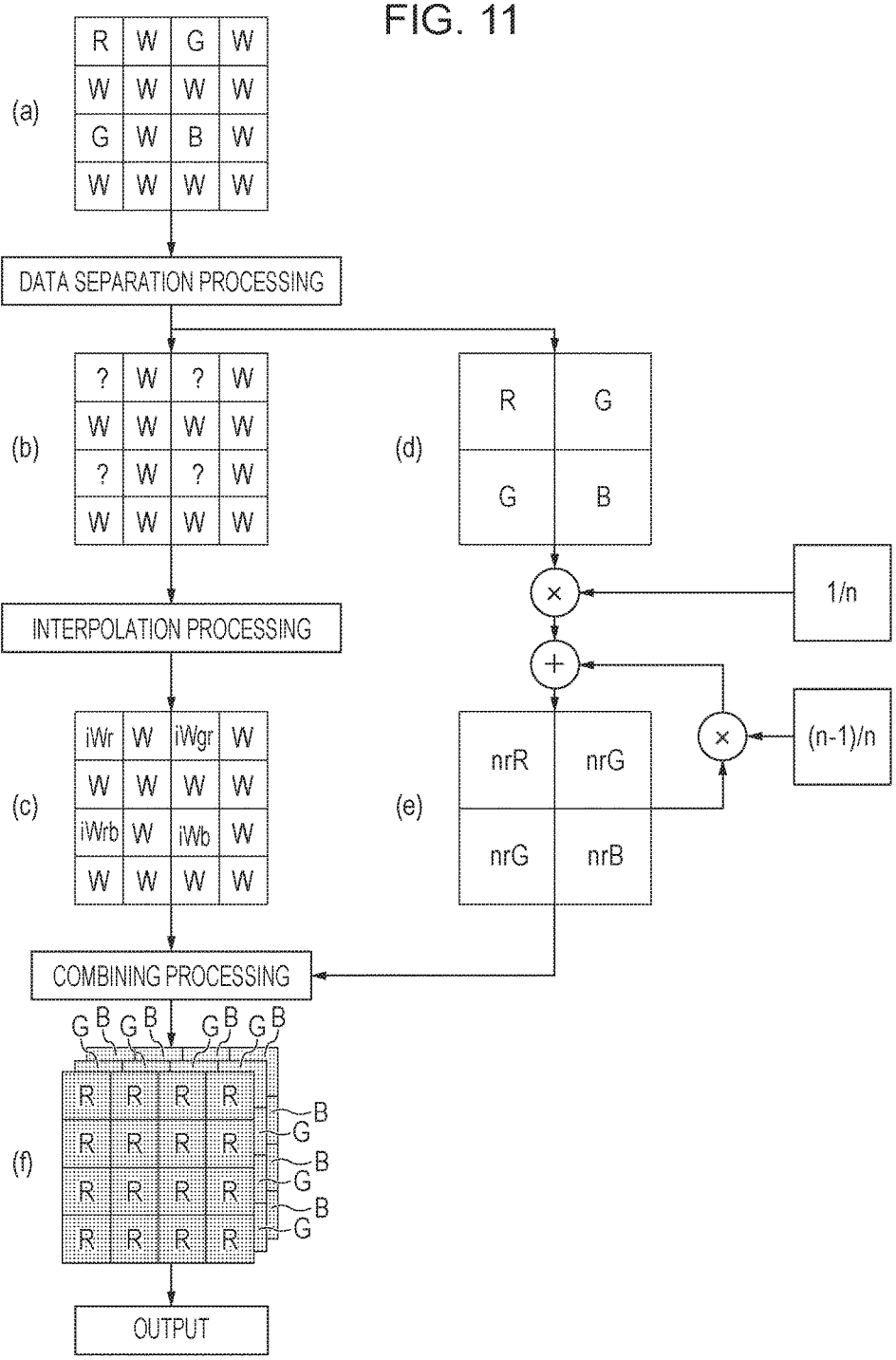
FIG. 11 illustrates the signal processing of the image pickup apparatus.

FIG. 11 illustrates a detail of the signal processing in the case of the RGBW 12 array corresponding to the CF array according to the present example.

(a) in FIG. 11 illustrates the data input to the interpolation unit 205. Herein, 4×4 pixels corresponding to a unit of repetition among the CF array illustrated in FIG. 3B are cut out and illustrated. The data separation processing is performed on this data. According to this configuration, the resolution data illustrated in (b) in FIG. 11 and the color data illustrated in (d) in FIG. 11 are obtained.

The interpolation processing performed on the resolution data illustrated in (b) in FIG. 11 is the same as that of Example 1.

Next, frame average processing of the color data will be described.

First, the color data of the first frame is stored in the frame memory in advance. Multiplication or division processing which will be described below is not performed on this color data of the first frame.

Next, the color data of the second frame will be described. As illustrated in FIG. 11, the interpolation unit 205 first multiplies the color data of the second frame by a coefficient 1/n. n is a frame number in which the inter frame processing is performed. According to the present example, n is set as 2. Thus, each of the signal values of the R pixel, the G pixel, and the B pixel of the second frame becomes ½. Next, the interpolation unit 205 multiplies the color data of the first frame held in the frame memory by a coefficient (n−1)/n. Since n is 2, each of the signals of the R pixel, the G pixel, and the B pixel of the color data of the first frame becomes ½. Subsequently, the interpolation unit 205 adds the signal of the first frame multiplied by ½ to the signal of the second frame multiplied by ½. According to this configuration, it is possible to obtain the color average data in which the color data of the first frame and the color data of the second frame are averaged.

It should be noted that, in a case where n is 3 or higher, the interpolation unit 205 adds a signal obtained by multiplying the signal of the color data in which the color data of the first frame and the color data of the second frame are averaged by ⅔ to a signal obtained by multiplying the color data included in the third frame by ⅓. According to this configuration, it is possible to obtain the color average data in which the pieces of the color data included in the three frames are averaged.

nrR, nrG, and nrB in FIG. 11 denote the color data of the R pixel, the G pixel, and the B pixel after the inter frame processing (noise reduction) is performed.

Subsequently, the interpolation unit 205 combines the W data after the interpolation of (c) in FIG. 11 with the color data after the noise reduction of FIG. 11 (e). According to the combining, color ratios of interpolation data iW of W at locations where the RGB pixels are originally arranged and the respective RGB of nrR, nrG, and nrB at these locations are calculated, and values obtained by multiplying the color ratios by W or iW of the respective pixels become values of RGB for the respective pixels. In this manner the color data of FIG. 11 (f) is formed to be output. The output will be described by the following expression.

In a case where this pixel is W, the following expression is established.

$$RGB = \left[\frac{nrR}{iWr}W \quad \frac{nrG}{iWg}W \quad \frac{nrB}{iWb}W\right] \quad (7)$$

In a case where this pixel is iW, the following expression is established.

$$RGB = \left[\frac{nrR}{iWr}iW \quad \frac{nrG}{iWg}iW \quad \frac{nrB}{iWb}iW\right] \quad (8)$$

Where iWr, iWg, and iWb denote iW values of the parts of the R pixel, the G pixel, and the B pixel.

The signal processing of the other interpolation unit 205 and the signal processing of the conversion unit 206 and the image processing unit 203 are the same as those of Example 1.

FIG. 12 illustrates evaluation results of a noise degradation degree and an image lag degree with regard to the picked-up image generated by performing the above-described signal processing. In each of the noise evaluation and the image lag evaluation of FIG. 12, from a superior evaluation, ○, Δ, and x are assigned in a descending order.

In addition, as a condition of the evaluation, a value of n in the above-described coefficients [1/n] and [(n−1)/n] for the luminance of the image pickup environment and the number of frames for the color data processing is changed to perform the evaluation.

As a condition No. 1, the luminance of the image pickup scene is set as 10 lux, and n of the average processing frame number of the color data is set as n=1. The image picked up under this condition hardly has noise, and also the image lag is not observed. Thus, the noise evaluation and the image lag evaluation are both ○.

As a condition No. 2, the luminance of the image pickup scene is set as 10 lux, and n=4 is set. The image picked up under this condition hardly has noise. In addition, since n=4 is set, as compared with the condition No. 1 where n=1 is set, an area exists in which the image lag is observed where the color is blurred, but it is within an allowable range. Thus, the noise evaluation is ○, and the image lag evaluation is Δ.

As a condition No. 3, the luminance of the image pickup scene is set as 1 lux, and n=1 is set. In the image picked up under this condition, because of the reduction in the light quantity in the image pickup scene, noise caused by the decrease in the S/N ratio of the resolution data and the color data is slightly observed. In the image picked up under this condition, the image lag is not observed. Thus, the noise evaluation is Δ, and the image lag evaluation is ○.

As a condition No. 4, the luminance of the image pickup scene is set as 1 lux, and n=4. In this condition, by performing the average processing on the color data in the plurality of frames, the image is obtained in which the noise is reduced as compared with the image picked up under the condition No. 3. In addition, the image lag is the same level as the image picked up under the condition No. 2, and it is within the allowable range. Thus, the noise evaluation is ○, and the image lag evaluation is Δ.

As a condition No. 5, the luminance of the image pickup scene is set as 0.1 lux, and n=1 is set. In this condition, since the further decrease occurs in the S/N ratio of the resolution data and the color data as compared with the condition No. 3, the image having the conspicuous noise is picked up. On the other hand, since n=1 is set, the image lag is not observed. Thus, the noise evaluation is x, and the image lag evaluation is ○.

As a condition No. 6, the luminance of the image pickup scene is set as 0.1 lux, and n=4 is set. In this condition, by performing the average processing on the color data in the plurality of frames, the image is obtained in which the noise is reduced as compared with the image picked up under the condition No. 5. In addition, the processing frame number for the color data n=4 is set, but the image lag degree is within the allowable range. Thus, in FIG. 12, the noise evaluation is Δ, and the image lag evaluation is Δ.

In this manner, by performing the average processing of the color data included in the plurality of frames, the image pickup apparatus according to the present example can generate the image having the suppressed image lag while the noise is reduced.

The image pickup apparatus according to the present example generates the image by using the color average data obtained by performing the average processing on the data of the RGB pixels included in the n frames and the data of the W pixels included in one frame that is fewer than the n frames. The value of n is preferably set as a number higher than or equal to 1/X when a proportion of the number of the W pixels out of the number of all the pixels on which the light is incident is set as X. According to this configuration, it is possible to suppress the generation of the false color that increases as the number of the W pixels is increased.

It should be noted that the image pickup apparatus according to the present example may appropriately change the value of n in accordance with an environment of the subject such as, for example, luminance, contrast, or movement speed.

Example 4

Descriptions will be mainly given of a difference from the image pickup apparatus according to Example 3 with regard to the image pickup apparatus according to the present example. The image pickup apparatus according to the present example generates one image by using the color data obtained by processing the color data included in the plurality of frames and the resolution data obtained by processing the resolution data included in a plurality of frames that are fewer than the number of frames used in the processing of the color data.

Figure 13:
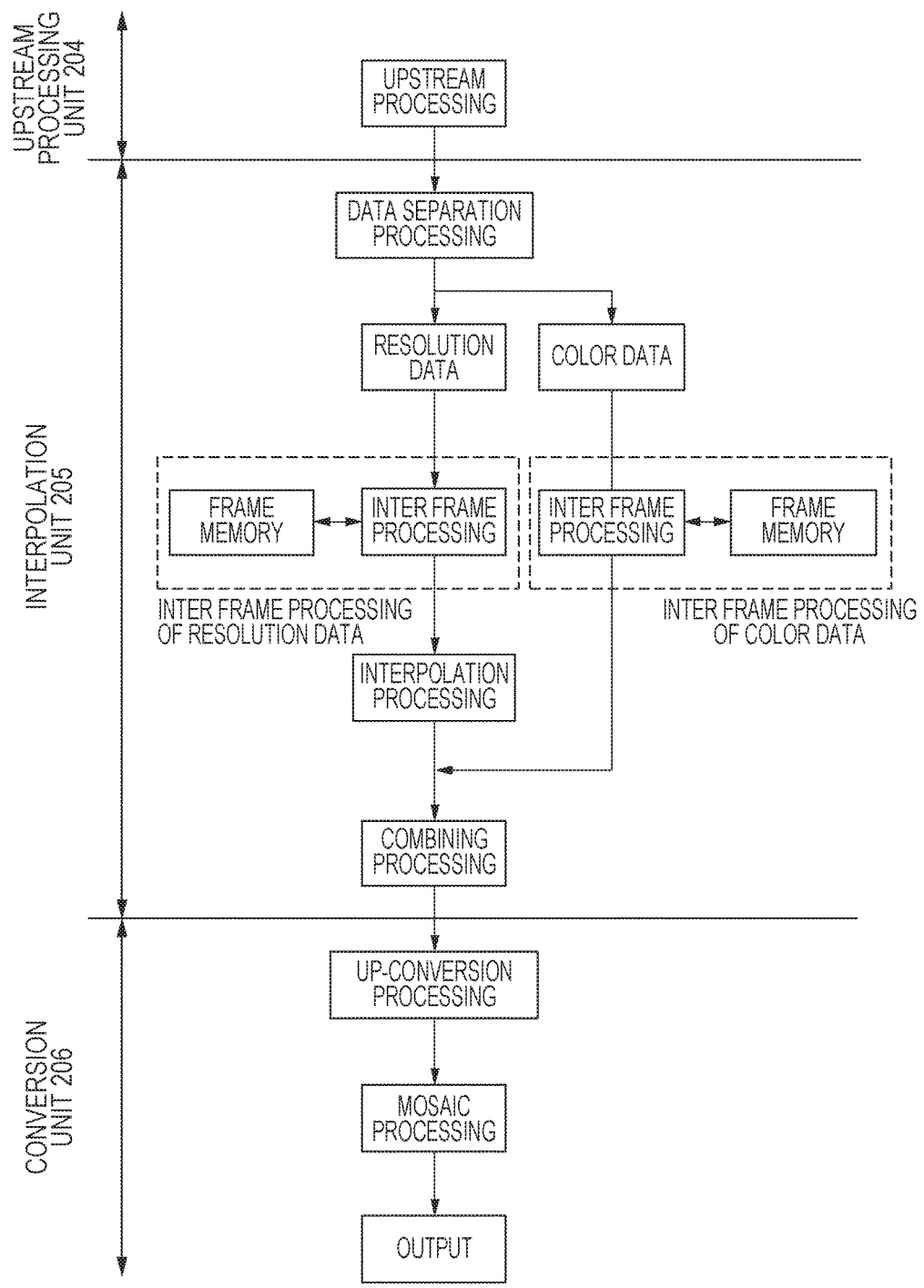
FIG. 13 illustrates the signal processing of the image pickup apparatus.

FIG. 13 is a flow chart illustrating an operation of the image pickup apparatus according to the present example.

The interpolation unit 205 separates the signal output by the image pickup element 201 into the resolution data and the color data. Thereafter, with regard to the resolution data, the resolution data is generated by processing the resolution data included in m frames. In addition, with regard to the color data, the color data is generated by processing the color data included in n frames that are more than the m frames.

It is more difficult for the human eyes to recognize the image lag with respect to the color than the image lag with respect to the resolution. For this reason, the average processing frame number for the resolution data used for the generation of the single image is set to be lower than the average processing frame number for the color data. According to this configuration, the image pickup apparatus according to the present example can generate the image having the reduced noise while the image lag caused in the image is made difficult for the human eyes to be recognized.

The signal processing of the other interpolation unit 205 and the signal processing of the conversion unit 206 and the image processing unit 203 are the same as those of Example 1.

FIG. 14 illustrates evaluation results according to the present example. In each of the noise evaluation and the image lag evaluation of FIG. 14, from a superior evaluation, ○, Δ, marked-out Δ, and x are assigned in a descending order.

As a condition No. 1, the luminance of the image pickup scene is set as 10 lux, and m=1 and n=1 are set. The noise evaluation and the image lag evaluation of the image picked up under this condition are both ○.

As a condition No. 2, the luminance of the image pickup scene is set as 1 lux, and m=1 and n=4 are set. The noise evaluation of the image picked up under this condition is ○, and the image lag evaluation is Δ.

As a condition No. 3, the luminance of the image pickup scene is set as 1 lux, and m=2 and n=4 are set. The noise evaluation of the image picked up under this condition is ○, and the image lag evaluation is marked-out Δ. In the image obtained under the condition No. 3, an increase in the image lag within an allowable range is observed as compared with the image obtained under the condition No. 2.

As a condition No. 4, the luminance of the image pickup scene is set as 0.1 lux, and m=1 and n=1 are set. The noise evaluation of the image picked up under this condition is x, and the image lag evaluation is ○.

As a condition No. 5, the luminance of the image pickup scene is set as 0.1 lux, and m=1 and n=4 are set. The noise evaluation of the image picked up under this condition is marked-out Δ, and the image lag evaluation is Δ. As compared with the image picked up under the condition No. 4, the image picked up under the condition No. 5 is an image in which the noise is reduced while the image lag is increased within the allowable range.

As a condition No. 6, the luminance of the image pickup scene is set as 0.1 lux, and m=2 and n=4 are set. The noise evaluation of the image picked up under this condition is Δ, and the image lag evaluation is marked-out Δ. As compared with the image picked up under the condition No. 5, the image picked up under the condition No. 6 is an image in which the noise is reduced while the image lag is increased within the allowable range.

As a condition No. 7, the luminance of the image pickup scene is set as 0.01 lux, and m=1 and n=4 are set. The noise evaluation of the image picked up under this condition is x, and the image lag evaluation is Δ.

As a condition No. 8, the luminance of the image pickup scene is set as 0.01 lux, and m=2 and n=4 are set. The noise evaluation of the image picked up under this condition is marked-out Δ, and the image lag evaluation is marked-out Δ. As compared with the image picked up under the condition No. 7, the image picked up under the condition No. 8 is an image in which the noise is reduced while the image lag is increased within the allowable range.

As a condition No. 9, the luminance of the image pickup scene is set as 0.01 lux, and m=4 and n=4 are set. The noise evaluation of the image picked up under this condition is Δ, and the image lag evaluation is x. As compared with the image picked up under the condition No. 8, while the noise is reduced in the image picked up under the condition No. 9, the image lag is increased beyond the allowable range.

In this manner, as may be understood from the comparison between, for example, the condition No. 5 and the condition No. 6, the image pickup apparatus according to the present example can generate the image having the reduced noise while the resolution average data obtained by performing the average processing on the resolution data included in the plurality of frames is used for the generation of the single image. Under the condition No. 9 where the numbers of frames of the resolution data and the color data used for the generation of the single image are matched with each other, the image lag is increased beyond the allowable range. When the number of frames of the resolution data used for the generation of the single image is set to be lower than the number of frames of the color data, the image pickup apparatus according to the present example can generate the image having the reduced noise while the increase in the image lag is suppressed.

On the other hand, when the resolution average data obtained by performing the average processing on the resolution data included in the plurality of frames is used for the generation of the single image, the image lag may be increased in some cases. Therefore, in a case where the subject remains still, the color average data having a frame number n1 and the resolution average data having a frame number m1 are used for the generation of the single image. m1 is a number lower than n1. On the other hand, in a case where the subject is in motion, the resolution average data having a frame number lower than that of the case where the subject remains still may be used for the generation of the single image. In a case where the subject is in motion, the generation of the single image the resolution data included in only one frame may be preferably used.

In addition, the evaluation of the TV resolution is performed with regard to the resolution. In the output data according to the present example, the TV horizontal resolution is more than or equal to 1000.

It should be noted that the descriptions have been given while the processing frame number n1 for the resolution data is set as 1 and the processing frame number n2 for the color data is set as 4 according to the present example, but the values of n1 and n2 may be appropriately changed preferably in accordance with the environment of the subject (luminance, contrast, or movement speed).

Example 5

Descriptions will be mainly given of a difference from Example 3 with regard to the image pickup apparatus according to the present example. According to the present example, the CF array uses the RGBW 12 array represented in FIG. 3D. When an RGBG 12 array is used, since the W pixel is replaced by the G pixel, the sensitivity is decreased as compared with the RGBW 12 array. However, since the W pixel has the substantially high sensitivity with respect to the RGB pixels, a saturation of the W pixel occurs early depending on the subject, and a dynamic range may be decreased in some cases. Therefore, when the CF array uses the RGBG 12 array, the saturation and the sensitivity are balanced.

Figure 15:
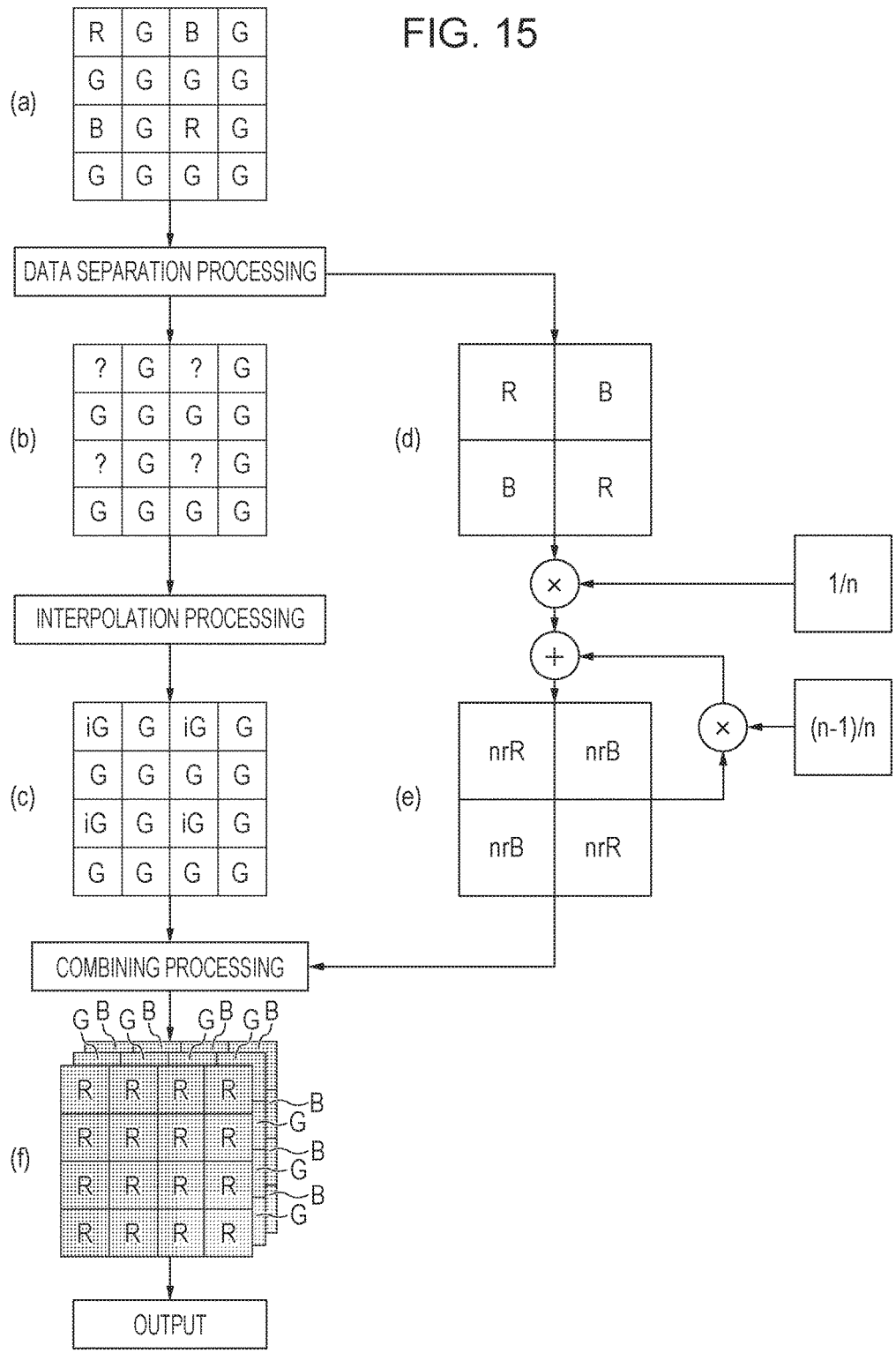
FIG. 15 illustrates the signal processing of the image pickup apparatus.

FIG. 15 is a flow chart in the interpolation unit 205 for data of the RGBG 12 array corresponding to the CF array according to the present example.

(a) in FIG. 15 illustrates input data. Herein, 4×4 pixels corresponding to a unit of repetition among the CF array illustrated in FIG. 3D are cut out and illustrated. This data is separated into resolution data illustrated in (b) in FIG. 15 and the color data illustrated in (d) in FIG. 15.

In the resolution data in which the data of the G pixel illustrated in (c) in FIG. 15 is used as a base, the data of the R and B pixels illustrated in (c) in FIG. 15 is unclear (which is represented as "?" in the drawing). The interpolation processing is performed on this unclear data parts, and the resolution data after the interpolation illustrated in (c) in FIG. 15 is created. A value of the interpolated pixel is represented as iG.

Since the number of RGB pixels is only ½ out of the total pixels, the color data illustrated in (c) in FIG. 15 becomes the data having the low resolution. Thereafter, the noise reduction of the color data is performed from the plurality of frames. According to the present example, the processing is performed while n=2 is set. nrR, nrG, and nrB in (e) in FIG. 15 denote the data of the RGB pixels after the noise reduction.

The resolution data after the interpolation illustrated in (c) in FIG. 15 which has been described in the above-described process is combined with the color data after the noise reduction illustrated in (e) in FIG. 15 to form the RGB data illustrated in (f) in FIG. 15 to be output.

Evaluation image pickup is performed by using the image pickup apparatus that has carried out the above-described processing. As the result of the image pickup, the image pickup apparatus can be obtained in which the saturation of the RGB pixels is balanced although the sensitivity is decreased as compared with the image pickup apparatus according to Example 3.

Example 6

Descriptions will be mainly given of a difference from Example 3 with regard to the image pickup apparatus according to the present example. According to the present example, the CMYW 12 array illustrated in FIG. 4B is used as the CF array. Since the complementary color (C, M, and Y) filters having the high sensitivity are used and the W pixels are also used, the sensitivity is improved.

Figure 16:
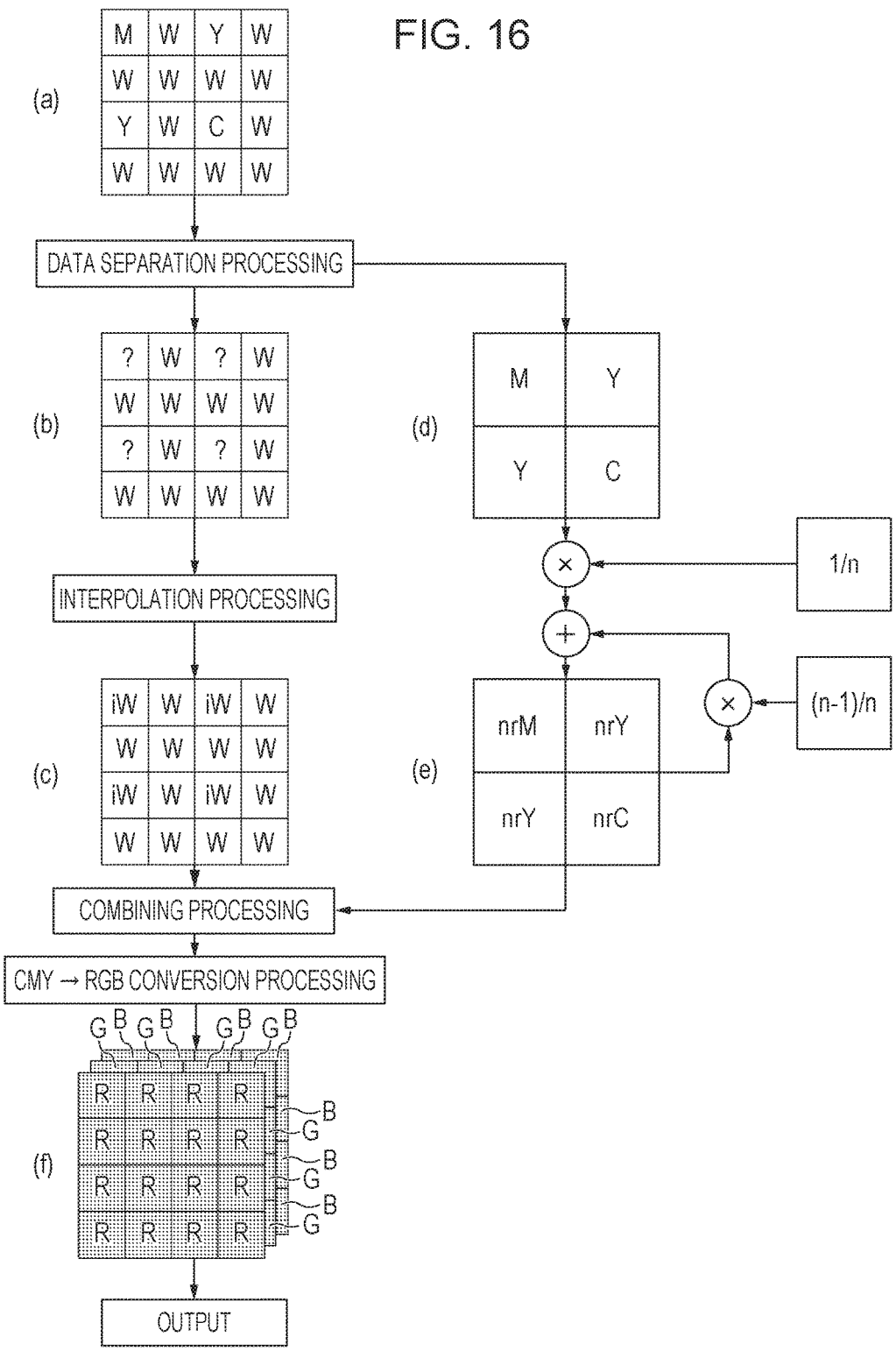
FIG. 16 illustrates the signal processing of the image pickup apparatus.

FIG. 16 is a flow chart in the interpolation unit 205 for data of the CMYW 12 array corresponding to the CF array according to the present example.

(a) in FIG. 16 illustrates input data. Herein, 4×4 pixels corresponding to a unit of repetition among the CF array illustrated in FIG. 4B are cut out and illustrated. This data is separated into resolution data illustrated in (b) in FIG. 16 and the color data illustrated in (d) in FIG. 16.

In the resolution data in which the data of the W pixel illustrated in (c) in FIG. 16 is used as a base, the W data at the parts of the CMY pixels illustrated in (c) in FIG. 16 is unclear (which is represented as "?" in the drawing). The interpolation processing is performed on this unclear data parts, and the resolution data after the interpolation illustrated in (c) in FIG. 16 is created. A value of the interpolated pixel is represented as iW.

Since the number of RGB pixels is only ¼ out of the total pixels, the color data illustrated in (c) in FIG. 16 becomes the data having the low resolution. Thereafter, the noise reduction of the color data is performed from the plurality of frames. According to the present example, the processing is performed while n=4 is set. nrC, nrM, and nrY in (e) in FIG. 16 denote the data of the RGB pixels after the noise reduction.

The resolution data after the interpolation illustrated in (c) in FIG. 16 which has been described in the above-described process is combined with the color data after the noise reduction illustrated in (e) in FIG. 16 similarly as in Example 5, and thereafter CMY-to-RGB conversion is performed to form the RGB data illustrated in (f) in FIG. 16 to be output.

Evaluation image pickup is performed by using the image pickup apparatus that has carried out the above-described processing. As the result of the image pickup, the image pickup apparatus can be obtained in which the sensitivity is higher as compared with the image pickup apparatus according to Example 3 although color reproducibility is decreased in part of images.

In addition, the evaluation of the TV resolution is performed with regard to the resolution. In the output data according to the present example, the TV horizontal resolution is more than or equal to 1000.

Example 7

Figure 17:
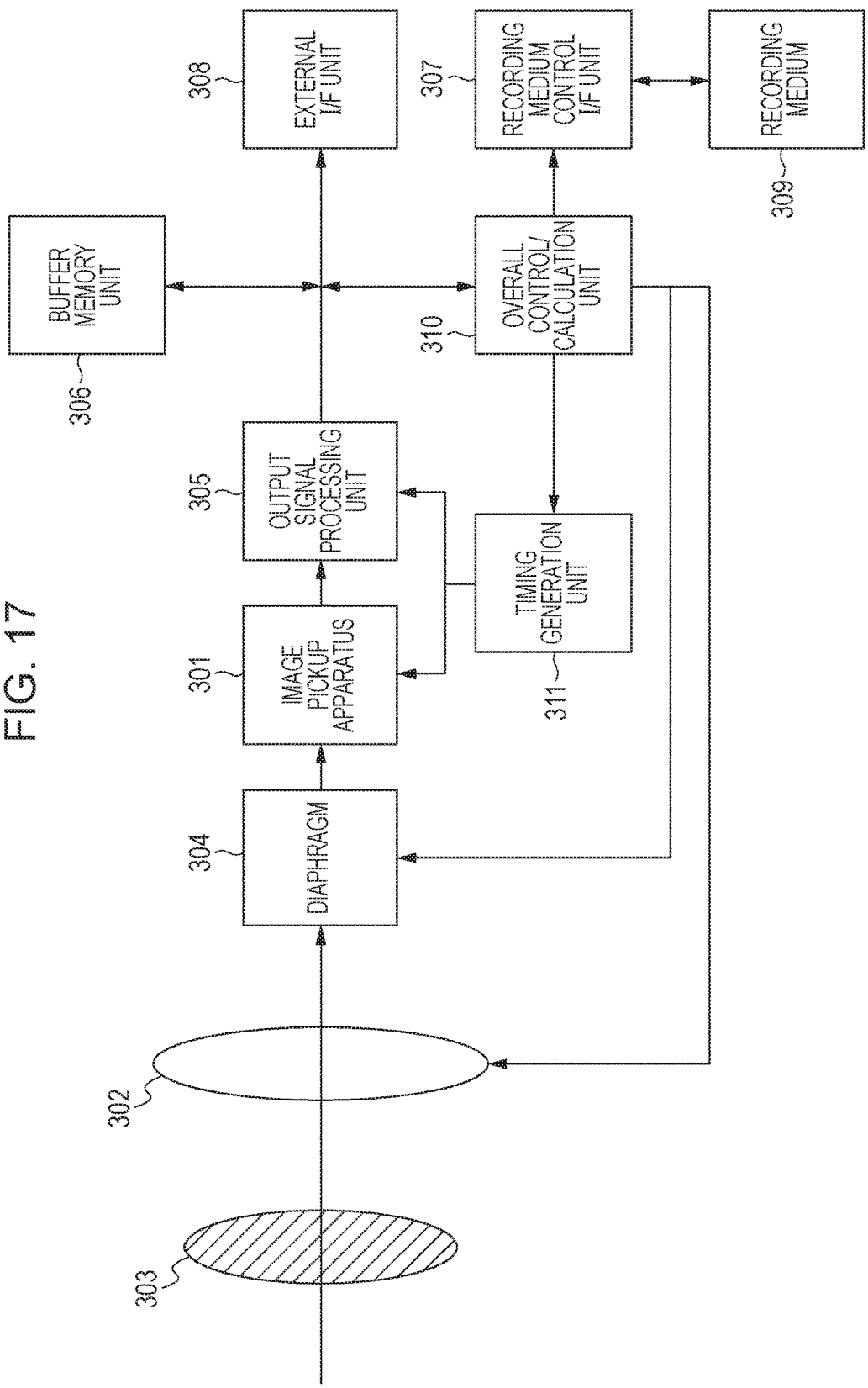
FIG. 17 illustrates an image pickup system.

According to the present example, an image pickup system to which the image pickup apparatus described according to the exemplary embodiment and Examples 1 to 6 is applied will be described. The image pickup system is an apparatus configured to obtain an image, video, and the like by using the image pickup apparatus, and examples thereof include a digital still camera, a digital camcorder, a monitoring camera, and the like. FIG. 17 is a block diagram of a case of the digital still camera as an example of the image pickup system to which the image pickup apparatus according to the exemplary embodiment and Examples 1 to 6 is applied.

In FIG. 17, the image pickup system includes a lens 302 that focuses an optical image of the subject on the image pickup apparatus 301, a barrier 303 that protects the lens 302, and a diaphragm 304 that adjusts the quantity of light that has passed through the lens 302. The image pickup system also includes an output signal processing unit 305 configured to perform processing on an output signal output by the image pickup apparatus 301. The output signal processing unit 305 also includes the image processing unit 203 described according to the exemplary embodiment and Examples 1 to 6. The output signal processing unit 305 is formed on a semiconductor substrate different from a semiconductor substrate on which the image pickup apparatus 301 is formed.

The output signal processing unit 305 includes a digital signal processing unit and performs an operation of performing various corrections and compressions on the signal output from the image pickup apparatus 301 when necessary and outputting the signal.

The image pickup system also includes a buffer memory unit 306 that temporarily stores image data and a storage medium control interface (I/F) unit 307 configured to perform recording or readout with respect to a recording medium. The image pickup system further includes a recording medium 309 that is detachably mounted or built in the image pickup system, such as a semiconductor memory configured to perform recording or readout of image pickup data. The image pickup system further includes an external interface (I/F) unit 308 configured to communicate with an external computer or the like and an overall control/calculation unit 310 configured to control various calculations and the entire digital still camera. The image pickup system further includes a timing generator 311 configured to output various timing signals to the output signal processing unit 305. It should be noted that control signals such as the timing signals may be input from an external unit instead of the timing generator 311. That is, it is sufficient if the image pickup system includes at least the image pickup apparatus 301 and the output signal processing unit 305 that processes the output signal output from the image pickup apparatus 301.

As described above, the image pickup system according to the present example can perform the image pickup operation can perform the image pickup operation with the application of the image pickup apparatus 301 described according to the exemplary embodiment and Examples 1 to 6.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-083609, filed Apr. 15, 2015, which is hereby incorporated by reference herein in its entirety.

What is claimed is:

1. An image pickup apparatus comprising:
a first pixel group including a plurality of pixels each including a photoelectric conversion unit;
a second pixel group including a plurality of pixels each including a photoelectric conversion unit; and
a signal processing unit,
the image pickup apparatus outputting data to an image processing unit configured to generate an image from data of a predetermined array, wherein
a wavelength band of lights to be photoelectrically converted in the photoelectric conversion units included in the first pixel group is different from a wavelength band of lights to be photoelectrically converted in the photoelectric conversion units included in the second pixel group,
the signal processing unit
generates resolution data by using signals output by the pixels included in the first pixel group, generates color data by using signals output by the pixels included in the second pixel group, and generates first data by performing de-mosaic processing on data generated by combining the resolution data with the color data,
generates second data by performing up-conversion processing on the first data, and
performs processing of setting the second data as the data of the predetermined array.

2. The image pickup apparatus according to claim 1, wherein
each of the pixels included in the first pixel group and each of the pixels included in the second pixel group have a light transmission part,
the wavelength band of the light that transmits through the light transmission part of the first pixel group includes a wavelength band in a range from blue to red, and
the wavelength band of the light that transmits through the light transmission part of the second pixel group is narrower than the wavelength band of the light that transmits through the light transmission part of the first pixel group.

3. The image pickup apparatus according to claim 2, wherein the first data is data including
a signal generated in a case where the light having the wavelength band to be photoelectrically converted by the photoelectric conversion unit included in the second pixel group is photoelectrically converted by the photoelectric conversion unit included in the first pixel group and a signal generated in a case where the light having the wavelength band to be photoelectrically converted by the photoelectric conversion unit included in the first pixel group is photoelectrically converted by the photoelectric conversion unit included in the second pixel group.

4. The image pickup apparatus according to claim 2, further comprising:
an image pickup element including the first pixel group and the second pixel group and a vertical scanning circuit configured to output signals from the first pixel group and the second pixel group by scanning the first pixel group and the second pixel group, wherein
the image pickup element outputs a signal of one frame when the vertical scanning circuit scans the first pixel group and the second pixel group once,
the image pickup element outputs signals of a plurality of frames when the vertical scanning circuit scans the first pixel group and the second pixel group plural times,
the signal processing unit generates color average data by performing average processing of the color data included in each of the signals of the plurality of frames for each pixel, and
the color data used for the generation of the first data is set as the color average data.

5. The image pickup apparatus according to claim 2, wherein
the wavelength band of the light that transmits through the light transmission part of the second pixel group corresponds to any one of colors of red, blue, and green.

6. The image pickup apparatus according to claim 1, wherein the first data is data including
a signal generated in a case where the light having the wavelength band to be photoelectrically converted by the photoelectric conversion unit included in the second pixel group is photoelectrically converted by the photoelectric conversion unit included in the first pixel group and a signal generated in a case where the light having the wavelength band to be photoelectrically converted by the photoelectric conversion unit included in the first pixel group is photoelectrically converted by the photoelectric conversion unit included in the second pixel group.

7. The image pickup apparatus according to claim 6, further comprising:
an image pickup element including the first pixel group and the second pixel group and a vertical scanning circuit configured to output signals from the first pixel group and the second pixel group by scanning the first pixel group and the second pixel group, wherein
the image pickup element outputs a signal of one frame when the vertical scanning circuit scans the first pixel group and the second pixel group once,
the image pickup element outputs signals of a plurality of frames when the vertical scanning circuit scans the first pixel group and the second pixel group plural times,
the signal processing unit generates color average data by performing average processing of the color data included in each of the signals of the plurality of frames for each pixel, and
the color data used for the generation of the first data is set as the color average data.

8. The image pickup apparatus according to claim 1, further comprising:
an image pickup element including the first pixel group and the second pixel group and a vertical scanning circuit configured to output signals from the first pixel group and the second pixel group by scanning the first pixel group and the second pixel group, wherein
the image pickup element outputs a signal of one frame when the vertical scanning circuit scans the first pixel group and the second pixel group once,
the image pickup element outputs signals of a plurality of frames when the vertical scanning circuit scans the first pixel group and the second pixel group plural times,
the signal processing unit generates color average data by performing average processing of the color data included in each of the signals of the plurality of frames for each pixel, and
the color data used for the generation of the first data is set as the color average data.

9. The image pickup apparatus according to claim 8, wherein the signal processing unit does not perform the average processing on the signals output by the first pixel group and performs the average processing on the signals output by the second pixel group.

10. The image pickup apparatus according to claim 8, wherein
the signal processing unit generates resolution average data by performing average processing on the resolution data included in each of the signals of the plurality of frames for each pixel,
the resolution data used for the generation of the first data is set as the resolution average data, and
the number of frames used for the generation of the resolution average data is lower than the number of frames used for the generation of the color average data.

11. The image pickup apparatus according to claim 1, wherein
the predetermined pattern is an RGB array.

12. The image pickup apparatus according to claim 1, wherein
the predetermined pattern is a Bayer array.

13. The image pickup apparatus according to claim 1, wherein
the processing of setting the second data as the data of the predetermined array is mosaic processing for converting an array of the second data into an RGB array.

14. The image pickup apparatus according to claim 1, wherein
the processing of setting the second data as the data of the predetermined array is mosaic processing for converting an array of the second data into a Bayer array.

15. An image pickup apparatus comprising:
a first pixel group including a plurality of pixels each including a photoelectric conversion unit;
a second pixel group including a plurality of pixels each including a photoelectric conversion unit; and
a signal processing unit,
the image pickup apparatus outputting data to an image processing unit configured to generate an image from data of a predetermined array, wherein
a wavelength band of lights to be photoelectrically converted in the photoelectric conversion units included in the first pixel group is different from a wave length band of lights to be photoelectrically converted in the photoelectric conversion units included in the second pixel group,
the number of pixels included in the first pixel group is a number more than twice as many as the number of pixels included in the second pixel group,
each of the pixels included in the first pixel group and each of the pixels included in the second pixel group have a light transmission part,
the wavelength band of the light that transmits through the light transmission part of the first pixel group includes a wavelength band in a range from blue to red,
the wavelength band of the light that transmits through the light transmission part of the second pixel group is narrower than the wavelength band of the light that transmits through the light transmission part of the first pixel group,
the signal processing unit
generates resolution data by using signals output by the pixels included in the first pixel group, generates color data by using signals output by the pixels included in the second pixel group, and
generates, by performing de-mosaic processing, first data including a signal generated in a case where the light having the wavelength band to be photoelectrically converted by the photoelectric conversion unit included in the second pixel group is photoelectrically converted by the photoelectric conversion unit included in the first pixel group by using the resolution data and the color data and a signal generated in a case where the light having the wavelength band to be photoelectrically converted by the photoelectric conversion unit included in the first pixel group is photoelectrically converted by the photoelectric conversion unit included in the second pixel group, and
the signal processing unit generates second data by performing up-conversion processing on the first data, and
performs mosaic processing of setting the second data as the data of the predetermined array.

16. The image pickup apparatus according to claim 15, wherein
the predetermined pattern is a Bayer array.

17. The image pickup apparatus according to claim 15, wherein
the mosaic processing is processing for converting an array of the second data into a Bayer array.

18. An image pickup apparatus comprising:
a first pixel group including a plurality of pixels each including a photoelectric conversion unit;
a second pixel group including a plurality of pixels each including a photoelectric conversion unit; and
a signal processing unit, wherein
a wavelength band of lights to be photoelectrically converted in the photoelectric conversion units included in the first pixel group is different from a wavelength band of lights to be photoelectrically converted in the photoelectric conversion units included in the second pixel group,
the signal processing unit
generates resolution data by using signals output by the pixels included in the first pixel group, generates color data by using signals output by the pixels included in the second pixel group, and generates first data by performing de-mosaic processing on data generated by combining the resolution data with the color data,
generates second data by performing up-conversion processing on the first data, and
performs mosaic processing on the second data.

19. An image pickup system comprising:
an image pickup apparatus; and
an image processing unit configured to generate an image from data of a predetermined array,
the image pickup apparatus including
a first pixel group including a plurality of pixels each including a photoelectric conversion unit,
a second pixel group including a plurality of pixels each including a photoelectric conversion unit, and
a signal processing unit,
the image pickup apparatus outputting data to the image processing unit, wherein
a wavelength band of lights to be photoelectrically converted in the photoelectric conversion units included in the first pixel group is different from a wavelength band of lights to be photoelectrically converted in the photoelectric conversion units included in the second pixel group,
the signal processing unit
generates resolution data by using signals output by the pixels included in the first pixel group, generates color data by using signals output by the pixels included in the second pixel group, and generates first data by performing de-mosaic processing on data generated by combining the resolution data with the color data,
generates second data by performing up-conversion processing on the first data, and
performs mosaic processing on the second data to be set as the data of the predetermined array.

20. A signal processing method of processing a signal output by an image pickup element,
the image pickup element including a first pixel group that includes a plurality of pixels each including a photoelectric conversion unit and a second pixel group that includes a plurality of pixels each including a photoelectric conversion unit,
a wavelength band of lights to be photoelectrically converted in the photoelectric conversion units included in the first pixel group is different from a wavelength band of lights to be photoelectrically converted in the photoelectric conversion units included in the second pixel group,
the signal processing method comprising:
generating resolution data by using signals output by the pixels included in the first pixel group, generating color data by using signals output by the pixels included in the second pixel group, and generating first data by performing de-mosaic processing on data generated by combining the resolution data with the color data;
generating second data by performing up-conversion processing on the first data; and
performing mosaic processing on the second data.

21. An image pickup apparatus comprising:
a plurality of pixels each including a photoelectric conversion unit; and
a signal processing unit,
the image pickup apparatus outputting data to an image processing unit configured to generate an image from data of a predetermined array, wherein
the signal processing unit receives first data that is mosaic pattern data,
generates second data by performing de-mosaic processing on the first data,
generates third data by performing up-conversion processing on the second data,
generates fourth data by performing mosaic processing on the third data, and
outputs the fourth data to the image processing unit.

22. An image pickup apparatus comprising:
a first pixel group including a plurality of pixels each including a photoelectric conversion unit;
a second pixel group including a plurality of pixels each including a photoelectric conversion unit; and
a signal processing unit,
the image pickup apparatus outputting data to an image processing unit configured to generate an image from data of a predetermined array, wherein
a wavelength band of lights to be photoelectrically converted in the photoelectric conversion units included in the first pixel group is different from a wavelength band of lights to be photoelectrically converted in the photoelectric conversion units included in the second pixel group,
the signal processing unit
generates resolution data by using signals output by the pixels included in the first pixel group, generates color data by using signals output by the pixels included in the second pixel group, and generates first data by performing de-mosaic processing on data generated by combining the resolution data with the color data,
generates second data by performing up-conversion processing on the first data, and
performs outputting data included in the second data so that the data of the predetermined array is input to the image processing unit.

23. The image pickup apparatus according to claim 22, wherein
the signal processing unit extracts data from the second data according to the predetermined array to generate the data to be output to the image processing unit.

* * * * *